United States Patent
Yumoto et al.

(10) Patent No.: US 7,697,733 B2
(45) Date of Patent: Apr. 13, 2010

(54) IMAGE COLLATING APPARATUS, IMAGE COLLATING METHOD, IMAGE COLLATING PROGRAM PRODUCT, AND COMPUTER READABLE RECORDING MEDIUM RECORDING IMAGE COLLATING PROGRAM PRODUCT

(75) Inventors: Manabu Yumoto, Nara (JP); Manabu Onozaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 810 days.

(21) Appl. No.: 11/528,393

(22) Filed: Sep. 28, 2006

(65) Prior Publication Data

US 2007/0071359 A1    Mar. 29, 2007

(30) Foreign Application Priority Data

Sep. 28, 2005   (JP)   ............... 2005-282314

(51) Int. Cl.
   *G06K 9/00*   (2006.01)
(52) U.S. Cl. ....................... 382/115; 382/124
(58) Field of Classification Search ................ 382/115, 382/124

See application file for complete search history.

(56) References Cited

U.S. PATENT DOCUMENTS

| | | | |
|---|---|---|---|
| 5,067,162 A * | 11/1991 | Driscoll et al. | 382/126 |
| 5,917,928 A * | 6/1999 | Shpuntov et al. | 382/124 |
| 2005/0084155 A1 | 4/2005 | Yumoto et al. | |
| 2005/0220327 A1 | 10/2005 | Itoh et al. | |

FOREIGN PATENT DOCUMENTS

| | | |
|---|---|---|
| JP | 63-211081 A | 9/1988 |
| JP | 1-158577 A | 6/1989 |
| JP | 1-209585 A | 8/1989 |
| JP | 5-233782 A | 9/1993 |
| JP | 2001-236500 A | 8/2001 |
| JP | 2003-323618 | 11/2003 |
| JP | 2005-149455 A | 6/2005 |
| JP | 2005-159576 A | 6/2005 |
| JP | 2005-242908 A | 9/2008 |

OTHER PUBLICATIONS

Japanese Office Action mailed Nov. 4, 2009 in corresponding Japanese application 2005-282314.

* cited by examiner

*Primary Examiner*—Tom Y Lu
(74) *Attorney, Agent, or Firm*—Nixon & Vanderhye, P.C.

(57) ABSTRACT

An image collating apparatus includes a storage device and a processor. The storage device stores data representing a sensing image, data representing a template image, and a program. The processor detects exclusion areas in the sensing image to be excluded from the image collation operation based on classification of image patterns. The processor determines whether or not the sensing image and the template image are derived from the identical object by performing template-matching operations to evaluate similarity between the template image and partial images of the sensing image in different levels with increasing the size of area covered by the partial image to be matched with the template image level by level. At least in one level the processor performs the template-matching operation with respect to the partial image where the exclusion areas are excluded.

13 Claims, 17 Drawing Sheets

| G(1) | G(2) | G(3) | G(4) | G(5) | G(6) | G(7) | G(8) |
|---|---|---|---|---|---|---|---|
| G(9) | G(10) | G(11) | G(12) | G(13) | G(14) | G(15) | G(16) |
| G(17) | G(18) | G(19) | G(20) | G(21) | G(22) | G(23) | G(24) |
| G(25) | G(26) | G(27) | G(28) | G(29) | G(30) | G(31) | G(32) |
| G(33) | G(34) | G(35) | G(36) | G(37) | G(38) | G(39) | G(40) |
| G(41) | G(42) | G(43) | G(44) | G(45) | G(46) | G(47) | G(48) |
| G(49) | G(50) | G(51) | G(52) | G(53) | G(54) | G(55) | G(56) |
| G(57) | G(58) | G(59) | G(60) | G(61) | G(62) | G(63) | G(64) |

| R | H | H | L | L |
|---|---|---|---|---|
| H | H | H | L | L |
| R | H | H | L | L |
| R | H | H | X | X |
| H | H | H | X | X |

| R | H | H | L | L |
|---|---|---|---|---|
| H | H | H | L | L |
| R | H | H | L | L |
| R | H | H | E | E |
| H | H | H | E | E |

IMAGE COLLATING APPARATUS, IMAGE COLLATING METHOD, IMAGE COLLATING PROGRAM PRODUCT, AND COMPUTER READABLE RECORDING MEDIUM RECORDING IMAGE COLLATING PROGRAM PRODUCT

This nonprovisional application is based on Japanese Patent Application No. 2005-282314 filed with the Japan Patent Office on Sep. 28, 2005, the entire contents of which are hereby incorporated by reference.

1. Field of the Invention

The present invention relates to an image collating apparatus, an image collating method, an image collating program product, and a computer readable recording medium recording the image collating program. More specifically, the present invention relates to an image collating apparatus, an image collating method, an image collating program product, and a computer readable recording medium recording the image collating program, for collating a plurality of images.

2. Description of the Background Art

Japanese Patent Laying-Open No. 2003-323618 discloses a method including the steps of: dividing a sensing image into partial areas; searching in all sensing partial areas so as to find out a position in a template image at which each partial area attains the best match with the template image; and determining whether a fingerprint is the same based on distribution of movement vectors between the sensing image and the template image that attained best match in searching.

According to the method disclosed in Japanese Patent Laying-Open No. 2003-323618, high collation accuracy can be attained.

On the other hand, the invention disclosed in Japanese Patent Laying-Open No. 2003-323618 is disadvantageous in excessive time period for processing and excessive power consumption, which results from a large amount of information processing. A large amount of information processing results from such processes that one entire image is initially divided into a plurality of partial areas and search in all partial areas for clarifying positional relation between the partial areas is carried out.

SUMMARY OF THE INVENTION

The present invention was made to solve the above-described problems, and an object of the present invention is to provide an image collating apparatus, an image collating method, an image collating program product, and a computer readable recording medium recording the image collating program, capable of attaining high collation accuracy with a small amount of search.

In order to attain the above-described objects, according to one aspect of the present invention, an image collating apparatus for performing an image collation operation includes a storage device, and a processor. The storage device stores image data representing a sensing image of an object sensed by a sensor, template data representing a template image, and a program. The processor receiving commands from the program for (a) detecting exclusion areas in the sensing image to be excluded from the image collation operation based on classification of image patterns, (b) determining whether or not the sensing image and the template image are derived from the identical object by performing template-matching operations to evaluate similarity between the template image and partial images of the sensing image in different levels, in the different levels the processor increasing the size of area covered by the partial image to be matched with the template image level by level, and at least in one level the processor performing the template-matching operation with respect to the partial image where the exclusion areas are excluded.

Preferably, each of the partial images includes a plurality of partial areas of the sensing image, and the processor, in the process for determining, (b-1) determines whether a first partial image among the partial images includes the exclusion area, the first partial image including the partial areas at predetermined positions in the first level, and (b-2) when the first partial image includes the exclusion area, skips the first level and then determines in the second level whether or not the sensing image and the template image are derived from the identical object based on the template-matching operation between the template image and a second partial image among the partial images which is larger than the first partial image and other than the exclusion areas.

Preferably, the processor, in the process for determining, (b-1) determines that the sensing image and the template image are derived from the identical object when a first partial image among the partial images matches with any portion of the template image, the exclusion areas being excluded from the first partial image and (b-2) when the first partial image does not match with the template image, determines whether or not the sensing image and the template image are derived from the identical object based on the template-matching operation between the template image and a second partial image among the partial images which is larger than the first partial image and other than the exclusion areas.

Preferably, the processor specifies, in the process for detecting, characteristic information which corresponds to classification of the image patterns in arrangements of pixels of an identical color in the partial image, and detects the excluded areas based on the characteristic information.

Preferably, each of the partial images includes a plurality of partial areas of the sensing image, and the exclusion area includes a first partial area and second partial areas adjacent to the first partial area, wherein the first and second partial areas correspond to the same classification category.

Preferably, each of the partial images includes a plurality of partial areas of the sensing image, the processor searches for a most similar portion in the template image for each the partial area, and the processor calculates similarity score between at least a part of the sensing image and at least a part of the template image based on positional relation between each the partial area and the searched portion.

Preferably, the processor, in the first level of the different levels, determines that the partial image matches with any portion of the template image if the similarity score is equal to or greater than a first threshold value, and determines that the partial image is different from any portion of the template image if the similarity score is smaller than a second threshold value.

Preferably, the processor, in the process for calculating, calculates the number of partial areas which satisfies a prescribed requirement of positional relation between a plurality of the partial areas and the searched portion.

Preferably, the partial image in the first level includes a partial area located in a center of the sensing image.

Preferably, the processor determines whether or not the sensing image and the template image are derived from the identical object based on different threshold values in the different levels.

Preferably, the storage device includes a device storing in advance the data representing the template image.

Preferably, the image collating apparatus further includes an input unit receiving data of an image of fingerprint as the image data representing the sensing image.

According to another aspect of the present invention, a method of collating an image for performing an image collation operation, includes the steps of: storing image data representing a sensing image of an object sensed by a sensor, template data representing a template image, and a program; detecting exclusion areas in the sensing image to be excluded from the image collation operation based on classification of image patterns; and determining whether or not the sensing image and the template image are derived from the identical object by performing template-matching operations to evaluate similarity between the template image and partial images of the sensing image in different levels, in the different levels the processor increasing the size of area covered by the partial image to be matched with the template image level by level, wherein the step of determining includes the step performing the template-matching operation of at least in one level with respect to the partial image where the exclusion areas are excluded.

According to another aspect of the present invention, an image collating program product for performing an image collation operation and causing a computer to execute the steps of: storing image data representing a sensing image of an object sensed by a sensor, template data representing a template image, and a program; detecting exclusion areas in the sensing image to be excluded from the image collation operation based on classification of image patterns; and determining whether or not the sensing image and the template image are derived from the identical object by performing template-matching operations to evaluate similarity between the template image and partial images of the sensing image in different levels, in the different levels the processor increasing the size of area covered by the partial image to be matched with the template image level by level, wherein the step of determining includes the step performing the template-matching operation of at least in one level with respect to the partial image where the exclusion areas are excluded.

According to another aspect of the present invention, a computer readable recording medium recording an image collating program for performing an image collation operation causing a computer to execute the steps of: storing image data representing a sensing image of an object sensed by a sensor, template data representing a template image, and a program; detecting exclusion areas in the sensing image to be excluded from the image collation operation based on classification of image patterns; and determining whether or not the sensing image and the template image are derived from the identical object by performing template-matching operations to evaluate similarity between the template image and partial images of the sensing image in different levels, in the different levels the processor increasing the size of area covered by the partial image to be matched with the template image level by level, wherein the step of determining includes the step performing the template-matching operation of at least in one level with respect to the partial image where the exclusion areas are excluded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
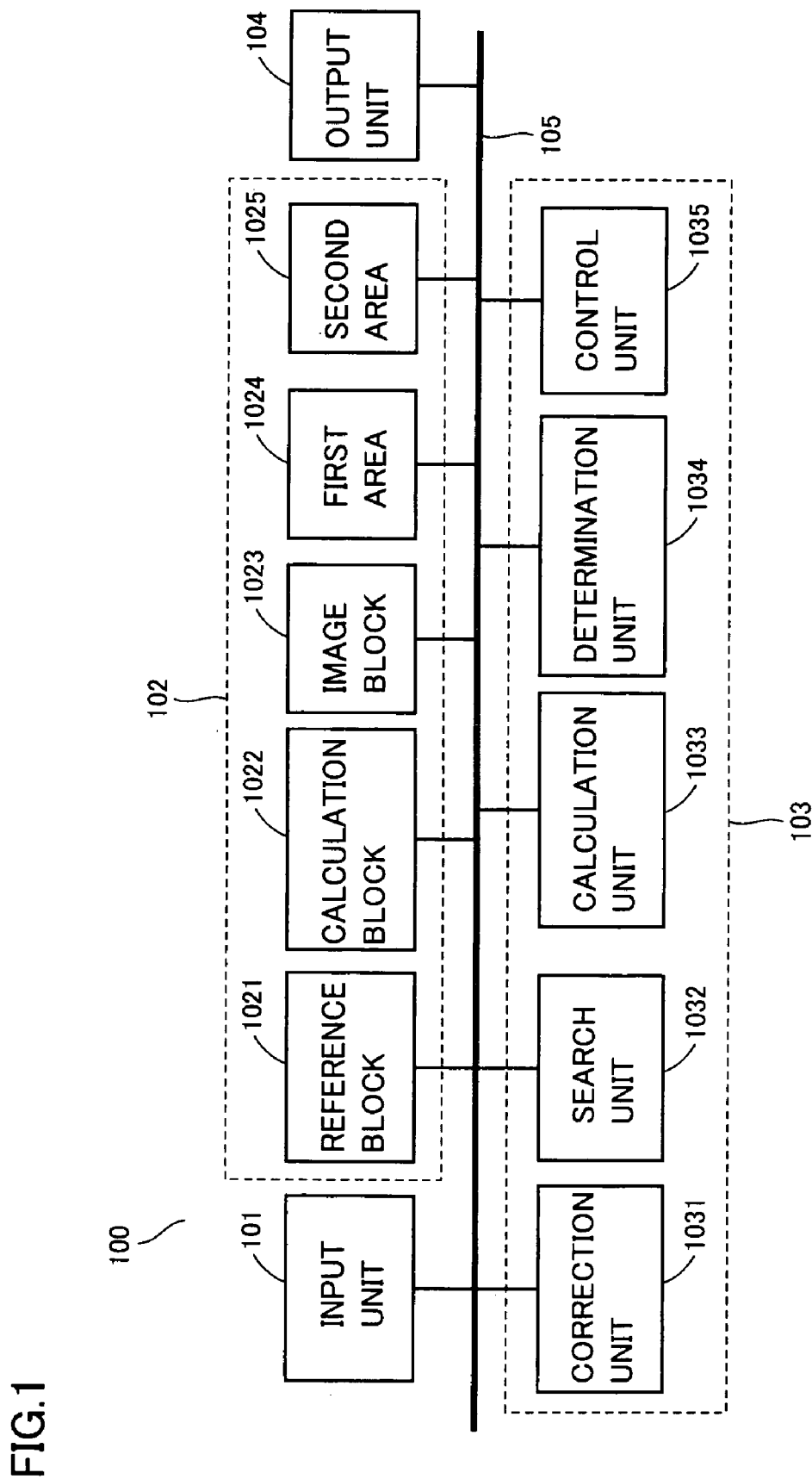
FIG. 1 is a block diagram representing a functional configuration of an image collating apparatus according to a first embodiment of the present invention.

An embodiment of the present invention will be described hereinafter with reference to the drawings. In the description below, the same elements have the same reference characters allotted, and their label and function are also identical. Therefore, detailed description thereof will not be repeated.

First Embodiment

In the following, an image collating apparatus according to a first embodiment of the present invention will be described.

Referring to FIG. 1, an image collating apparatus 100 according to the present embodiment includes an input unit 101, a storage unit 102, a processing unit 103, an output unit 104 (corresponding to a display 610 and a printer 690 which will be described later), and a bus 105. Input unit 101 includes a fingerprint sensor. Input unit 101 serves as an apparatus accepting data representing a sensing image (image A) and data representing a template image (image B) sensed by the fingerprint sensor. Here, the sensing image and the template image are both fingerprint images. Input unit 101 also serves as the apparatus outputting the read fingerprint image data to storage unit 102 and processing unit 103. The fingerprint sensor is of an optical type, a pressure type, or a static capacitance type, and the type thereof is designated by a user. In the present embodiment, it is assumed that an optical fingerprint sensor is included. Storage unit 102 serves as an apparatus storing data representing the sensing image, data representing the template image, and various calculation results. Processing unit 103 controls input unit 101 and storage unit 102. In addition, processing unit 103 also serves as a circuit performing information processing (including operation) necessary for collating the fingerprint. Output unit 104 serves as an apparatus outputting information stored in storage unit 102 and information created by processing unit 103. Bus 105 is used for transferring control signals and data signals between input unit 101, storage unit 102, and processing unit 103.

Storage unit 102 corresponds to a memory 624 or a fixed disk 626 which will be described later. Storage unit 102 includes a reference block 1021, a calculation block 1022, an image block 1023, a first area 1024, and a second area 1025. Reference block 1021 is a block temporarily storing data for reference. Calculation block 1022 is a block temporarily storing data during operation. Image block 1023 is a block storing image data of the sensing image and the template image. First area 1024 and second area 1025 are both areas storing positional information (in the present embodiment, information representing the coordinate at the upper left vertex among the vertices of a partial area is referred to as "positional information") and a movement vector which will be described later.

Arrangement of the partial areas of which positional information is stored in first area 1024 and second area 1025 will be described with reference to FIGS. 2 and 3.

In the present embodiment, the entire area of the sensing image is divided into 25 partial areas. The entire fingerprint image is covered with these partial areas. These partial areas are provided with identification numbers R(1) to R(25) respectively. FIG. 2 illustrates arrangement of these partial areas of the sensing image. First area 1024 stores positional information of partial areas R(1) to R(9). Partial areas R(1) to R(9) are partial areas located in the center of the sensing image. Partial areas R(1) to R(9) constitute a first portion representing collective of adjacent partial areas. Second area 1025 stores positional information of peripheral partial areas consisting of partial areas R(10) to R(25). Partial areas R(10) to R(25) constitute a second portion different from the first portion, representing collective of adjacent partial areas. It is noted that a portion of the sensing image containing the first portion is referred to as "containing portion".

In the present embodiment, the entire area of the template image is divided into 64 partial areas. The entire fingerprint image is covered with these partial areas. Each partial area has a size as large as that of each partial area in the sensing image. These partial areas are provided with identification numbers G(1) to G(64) respectively. FIG. 3 illustrates arrangement of these partial areas in image B. First area 1024 stores positional relation of partial areas G(1) to G(64).

Processing unit 103 includes a correction unit 1031, a search unit 1032, a calculation unit 1033, a determination unit 1034, and a control unit 1035. Correction unit 1031 performs density correction of image data input from input unit 101. Search unit 1032 searches for a position in the template image that attains the highest matching score, for a plurality of partial areas of the sensing image. Calculation unit 1033 calculates similarity score based on a movement vector which will be described later, using information representing a result of search by search unit 1032. Here, the "information representing a result of search" refers to information stored in reference block 1021. Calculation unit 1033 also serves as a circuit calculating a value or the like for determining characteristic information which will be described later. Determination unit 1034 determines whether the result of collation of the fingerprint indicates "match", "unmatch", or "none of the former" based on the similarity score calculated by calculation unit 1033. Control unit 1035 controls processing performed in each unit in processing unit 103.

Figure 4:
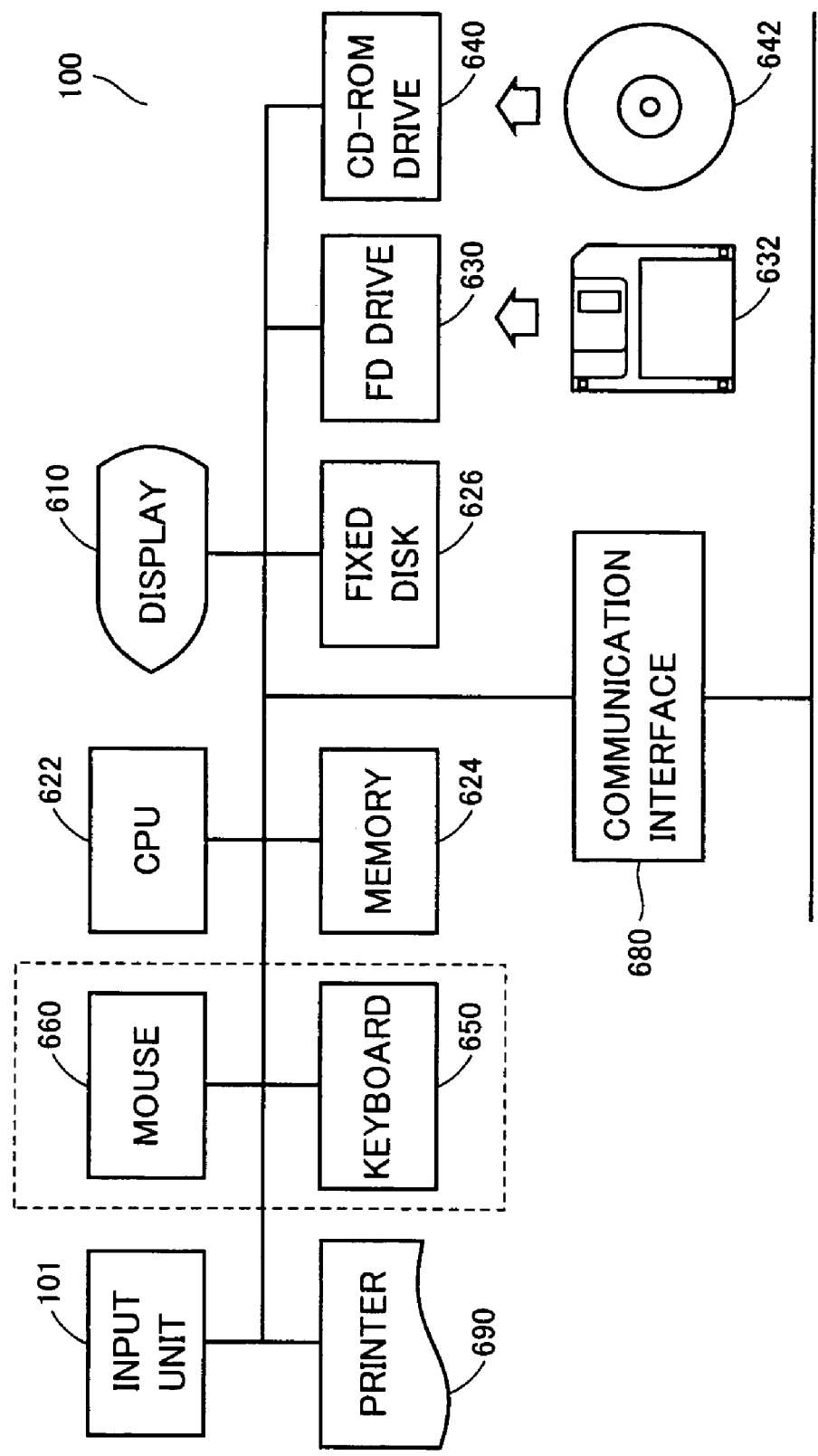
FIG. 4 is a block diagram showing a computer hardware configuration implementing the image collating apparatus according to the first embodiment of the present invention.

Image collating apparatus 100 is implemented by computer hardware shown in FIG. 4 and software executed by a CPU (Central Processing Unit) 622. Referring to FIG. 4, the computer hardware described above includes input unit 101, display 610 implemented by a liquid crystal display (or may be implemented by a CRT (Cathode-Ray Tube), however, in the present embodiment, it is assumed that display 610 is implemented by the liquid crystal display), CPU 622 for central management and control of the computer hardware itself, memory 624 including an ROM (Read Only Memory) or an RAM (Random Access Memory), fixed disk 626, an FD drive 630 on which an FD (Flexible Disk) 632 is detachably mounted and which accesses to FD 632 mounted thereon, a CD-ROM drive 640 on which a CD-ROM (Compact Disk Read Only Memory) is detachably mounted and which accesses to the mounted CD-ROM 642, a communication interface 680 for connecting the computer hardware to a communication network for establishing communication, a keyboard 650 accepting an input through keys, and a mouse 660 accepting an input through what is called a click-and-drag operation. These components are connected through a bus for communication. The computer hardware may be provided with a magnetic tape apparatus accessing to a cassette type magnetic tape that is detachably mounted thereto. In the present embodiment, however, it is assumed that such an apparatus is not provided. In general, such software is distributed with being stored in a recording medium such as FD 632 or CD-ROM 642, read from the recording medium by FD drive 630, CD-ROM drive 640 or the like, and once stored in fixed disk 626. In addition, the software is read out to memory 624 and executed by CPU 622 described above. The computer hardware itself described above is common. Therefore, the most essential part of the present invention resides in the software recorded in a recording medium such as FD 632 or CD-ROM 642.

Figure 5:
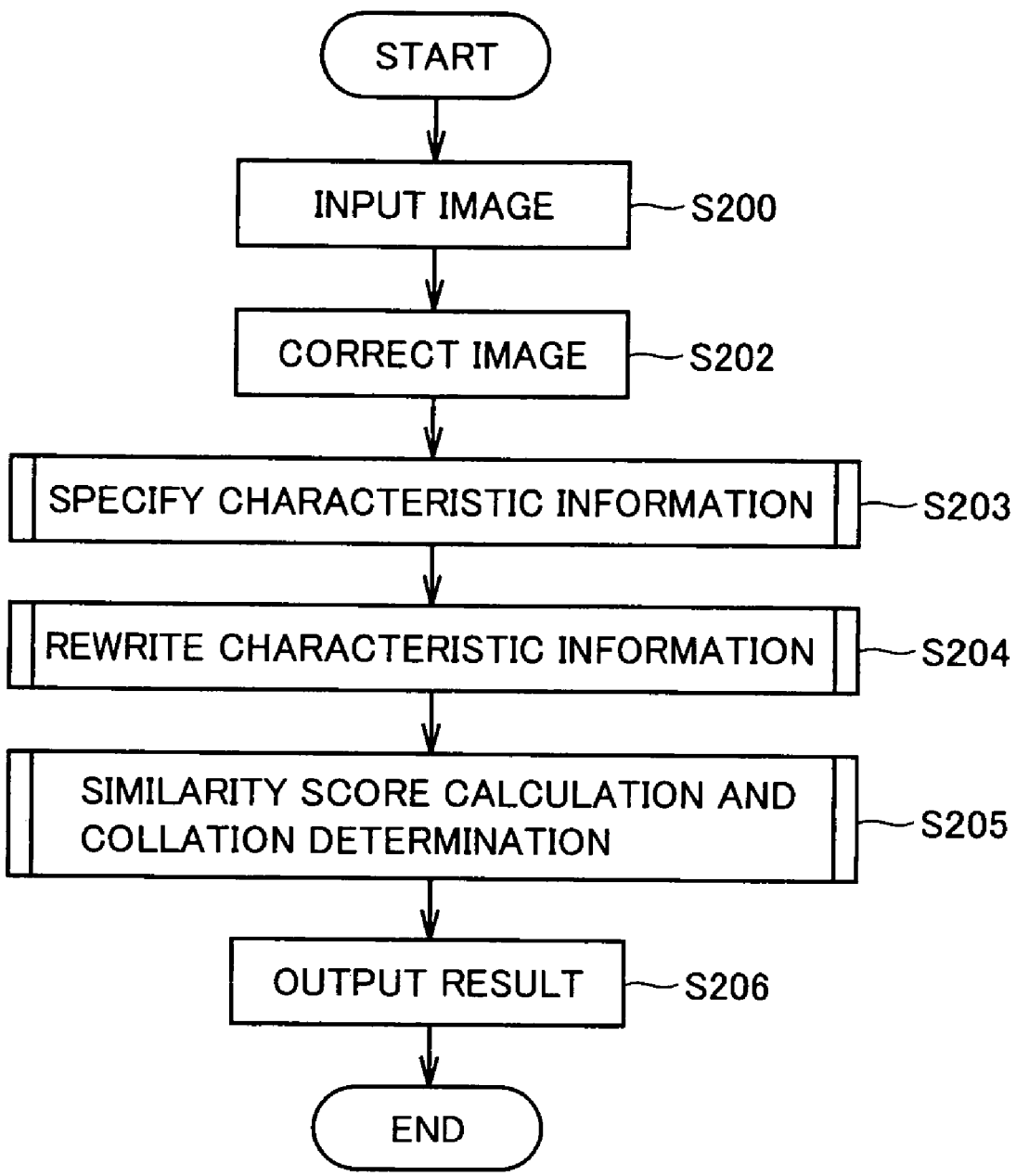
FIG. 5 is a flowchart representing a procedure for controlling fingerprint collation processing according to the first embodiment of the present invention.

Referring to FIG. 5, the program executed in image collating apparatus 100 carries out control for collation of fingerprints as follows.

In step 200 (hereinafter, step is abbreviated as S), control unit 1035 sends an image input start signal to input unit 101, and thereafter waits until an image input end signal is received. Input unit 101 accepts input of the sensing image, and outputs the sensing image to image block 1023 in storage unit 102 through bus 105. Reference block 1021 stores the image data of the sensing image. After the input of the sensing image is completed, input unit 101 sends the image input end signal to control unit 1035. When the image input end signal is transmitted, control unit 1035 again sends the image input start signal to input unit 101, and thereafter waits again until the image input end signal is received. Input unit 101 accepts input of the template image, and outputs the template image to image block 1023 in storage unit 102 through bus 105. Image block 1023 stores the image data of the template image. After the input of the template image is completed, input unit 101 sends the image input end signal to control unit 1035.

In S202, control unit 1035 sends an image correction start signal to correction unit 1031, and thereafter, waits until an image correction end signal is received. In most cases, the image accepted by input unit 101 is affected, in terms of tones of pixels and overall density distribution, by characteristics of input unit 101, dryness of fingerprint itself, and pressure with which fingers are pressed. Therefore, the quality of the image accepted by input unit 101 is uneven. As the image quality is uneven, it is not appropriate to use the accepted image data directly for collation. Correction unit 1031 corrects the image quality of input image to suppress variations of conditions when the image is input. Specifically, the entire or partial area of the input image is subjected to histogram planarization or image binarization processing. Correction unit 1031 performs such processing onto both of the sensing image and the template image. After the processing for the sensing image and the template image ends, correction unit 1031 sends the image correction end signal to control unit 1035. It is noted that histogram planarization refers to the processing executed as in the following steps. Specifically, in the first step, each pixel in the image is categorized based on a value representing density (density value). In the second step, the number of pixels having the same density value is counted. In the third step, the density value of each pixel is modified such that the number of pixels having the same density value is equal. A method of setting at which coordinate the density value of a pixel should be modified includes a method of extracting an arbitrary pixel and a method of referring to the density value of an adjacent pixel. In the present embodiment, the method of extracting an arbitrary pixel is employed for setting at which coordinate the density value of a pixel should be modified, because it is easy to create an algorithm. Alternatively, the image binarization processing refers to processing for modifying the density value to a maximum value or a minimum value depending on whether the density value of the pixel is equal to or greater than the threshold value determined in accordance with a method described later. The method of determining the threshold value includes what is called a p-tile method, a mode method, a differential histogram method, a discriminant analysis method, a variable threshold value method, and the like. In the present embodiment, the threshold value is determined using the mode method. The mode method refers to a method of determining the threshold value as in the following steps. Specifically, in the first step, the number of pixels for each density value is represented in a histogram. In the second step, the density value at which transition of the number of pixels for each density value turns from decrease to increase, that is, the bottom of the histogram, is detected, and this value is employed as the threshold value.

Figure 6:
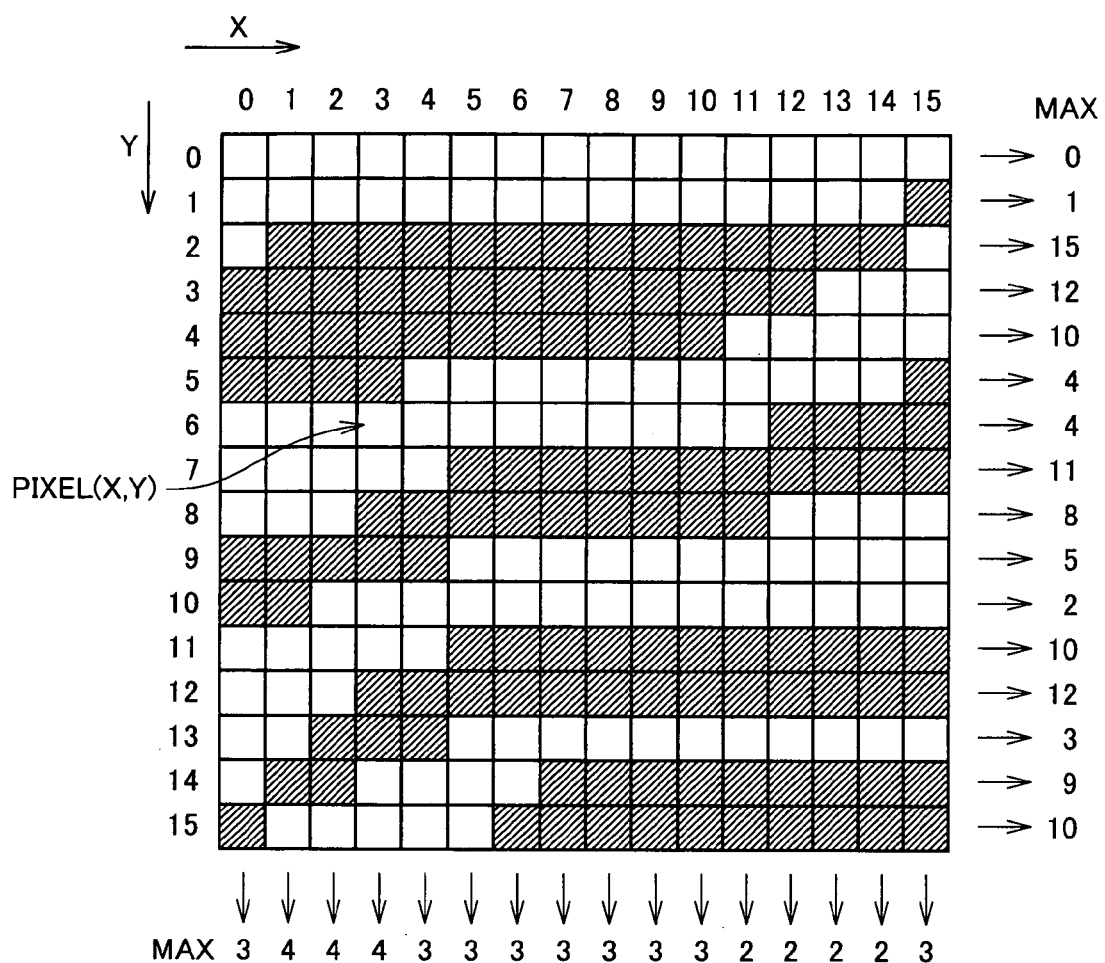
FIG. 6 illustrates a state of each pixel in the partial area according to the first embodiment of the present invention.

In S203, control unit 1035 specifies characteristic information. Here, the "characteristic information" refers to information corresponding to classification of patterns in arrangement of pixels having the same color in the partial area. The processing for specifying the characteristic information refers to processing repeating the processing in S210 to S226 shown in FIG. 7 for partial areas R(1) to R(25). The characteristic information will be described with reference to FIG. 6. FIG. 6 illustrates a state of each pixel in a partial area. The partial area in the present embodiment is constituted of 16×16 pixels. Here, "16×16" means that the number of pixels in the horizontal direction and the number of pixels in the vertical direction are both set to "16". In the present embodiment, the characteristic information is specified in the following procedure. The first procedure refers to a procedure for calculating a maximum value MAXHLEN of the number of black-filled pixels continuous in the horizontal direction. Here, maximum value MAXHLEN is the value representing how approximate to horizontal the pattern is (for example, lateral stripe). The second procedure is a procedure for calculating a maximum value MAXVLEN of the number of black-filled pixels continuous in the vertical direction. Here, maximum value MAXVLEN is the value representing how approximate to vertical the pattern is (for example, vertical stripe). The third procedure is a procedure for determining which of maximum value MAXHLEN and maximum value MAXVLEN is greater. If maximum value MAXHLEN is greater, the characteristic information is determined as a value "H" indicating horizontal (lateral stripe). If maximum value MAXVLEN is greater, the characteristic information is determined as a value "V" indicating vertical (vertical stripe). In the present embodiment, actually, if maximum value MAXVLEN is greater, the characteristic information is determined as either a value "R" indicating the vertical stripe extending toward upper right direction or a value "L" indicating the vertical stripe extending toward upper left direction, in accordance with the processing described later. Otherwise, the characteristic information is determined as "X". If maximum value MAXHLEN and maximum value MAXVLEN are both smaller than the lower limit, the characteristic information is determined as "X". In the present embodiment, the lower limit in the horizontal direction is represented as "HLEN(0)", and the lower limit in the vertical direction is represented as "VLEN(0)". The lower limit is set in advance, and the following equation expresses such definition:

if relation of MAXHLEN>MAXVLEN and MAXHLEN≧HLEN (0) is satisfied, determination as "H" is made;

if relation of MAXVLEN>MAXHLEN and MAXVLEN≧VLEN (0) is satisfied, determination as "V" is made; and otherwise, determination as "X" is made.

In S204, control unit 1035 rewrites the characteristic information. This processing corresponds to the processing in S300 to S304 shown in FIG. 10.

In S205, processing unit 103 performs similarity score calculation and collation determination with regard to the sensing image and the template image. This processing corresponds to the processing in S310 to S334 shown in FIG. 11.

In S206, control unit 1035 outputs information indicating the collation result to output unit 104. The information indicating the collation result is stored in reference block 1021. Output unit 104 outputs information output by control unit 1035.

Figure 7:
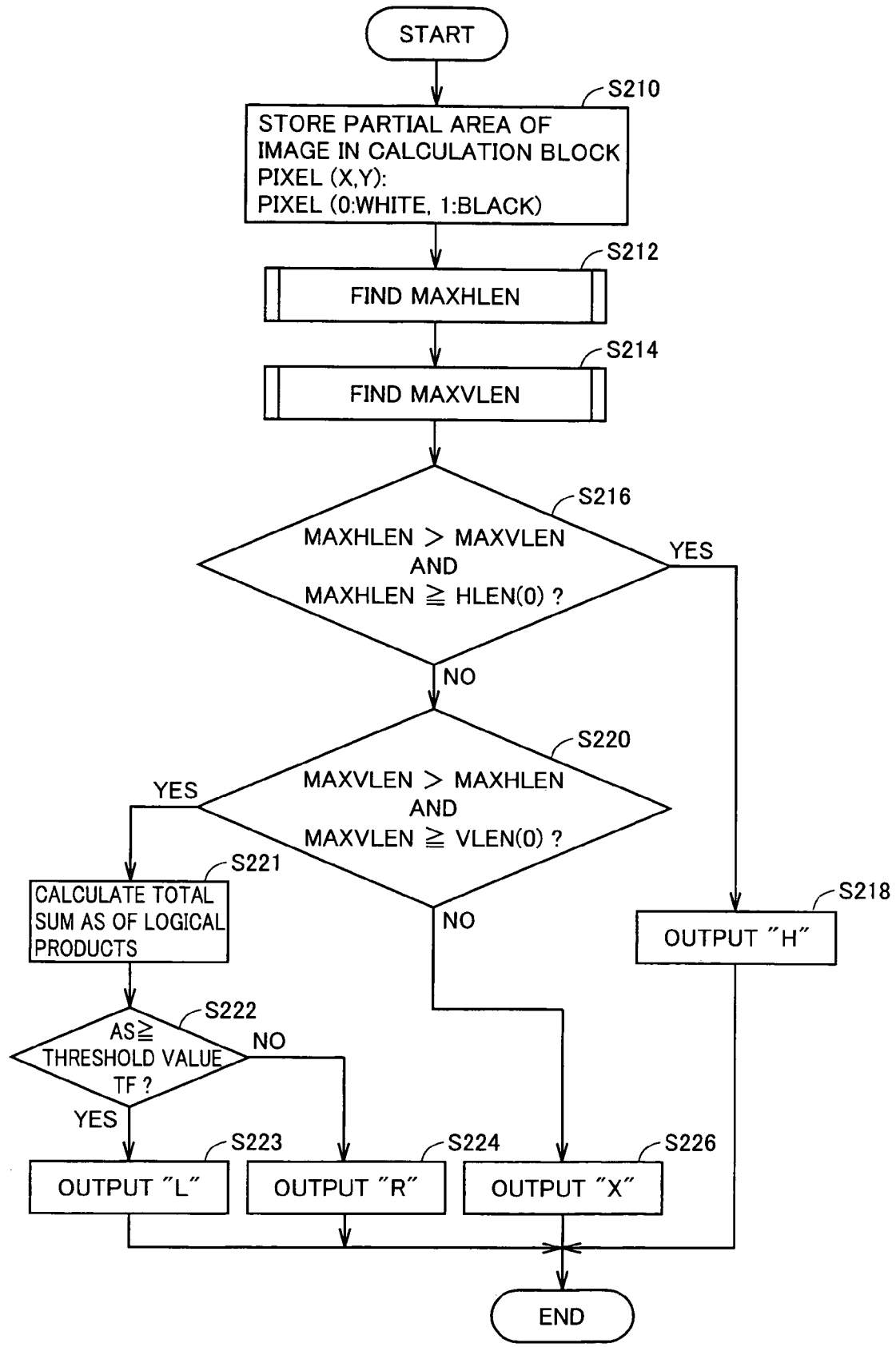
FIG. 7 is a flowchart showing a procedure for controlling characteristic information specifying processing according to the first embodiment of the present invention.

Referring to FIG. 7, the program executed in image collating apparatus 100 carries out control for specifying the characteristic information as follows.

In S210, control unit 1035 transmits a signal instructing start of determination to calculation unit 1033. When the signal is transmitted, control unit 1035 waits until a signal indicating the end of determination is received. Calculation unit 1033 reads partial area R(I) to be subjected to determination from image block 1023, and once stores the same in calculation block 1022. Storage of partial area R(I) is carried out by substituting a value representing a color into a variable PIXEL (X,Y). Here, the "value representing a color" substituted into variable PIXEL (X,Y) refers to a value representing a color of each pixel constituting partial area R(I). In the present embodiment, if the color of the pixel is white, "0" is substituted into variable PIXEL (X,Y). If the color of the pixel is black, "1" is substituted into variable PIXEL (X,Y). Substitution of a value into variable PIXEL (X,Y) is carried out by storing the value in a prescribed area in calculation block 1022.

In S212, calculation unit 1033 reads partial area R(I) stored in calculation block 1022. When partial area R(I) is read, calculation unit 1033 calculates maximum value MAXHLEN described above. This processing corresponds to the processing in S230 to S260 shown in FIG. 8.

In S214, calculation unit 1033 reads partial area R(I) stored in calculation block 1022. When partial area R(I) is read, calculation unit 1033 calculates maximum value MAXVLEN described above. This processing corresponds to the processing in S270 to S288 shown in FIG. 9.

In S216, calculation unit 1033 determines whether relation of MAXHLEN>MAXVLEN and MAXHLEN≧HLEN(0) is satisfied. If it is determined that relation of MAXHLEN>MAXVLEN and MAXHLEN≧HLEN(0) is satisfied (YES in S216), the process proceeds to S218. Otherwise (NO in S216), the process proceeds to S220.

In S218, calculation unit 1033 stores "H" in an area for storing the characteristic information of partial area R(I), included in first area 1024 or second area 1025. When the characteristic information is stored, calculation unit 1033 transmits a signal indicating the end of determination to control unit 1035.

In S220, calculation unit 1033 determines whether relation of MAXVLEN>MAXHLEN and MAXVLEN≧VLEN(0) is satisfied. If it is determined that relation of MAXHLEN>MAXHLEN and MAXVLEN≧VLEN(0) is satisfied (YES in S220), the process proceeds to S221. Otherwise (NO in S220), the process proceeds to S226.

In S221, calculation unit 1033 calculates total sum AS of logical products. Total sum AS of logical products is a value obtained by adding all the logical products of PIXEL (K,K) through PIXEL (LIM-K,LIM-K) from a case of K=0 to a case of K=LIM. Here, LIM represents the maximum value of a variable K. In the present embodiment, LIM is set to 15 (LIM=15).

In S222, determination unit 1034 determines whether total sum AS of logical products is equal to or greater than a threshold value TF. If it is determined that total sum AS of logical products is equal to or greater than threshold value TF (YES in S222), the process proceeds to S223. Otherwise (NO in S222), the process proceeds to S224.

In S223, calculation unit 1033 stores "L" in an area for storing the characteristic information of partial area R(I), included in first area 1024 or second area 1025. When the characteristic information is stored, calculation unit 1033 transmits a signal indicating the end of determination to control unit 1035.

In S224, calculation unit 1033 stores "R" in an area for storing the characteristic information of partial area R(I), included in first area 1024 or second area 1025. When the characteristic information is stored, calculation unit 1033 transmits a signal indicating the end of determination to control unit 1035.

In S226, calculation unit 1033 stores "X" in an area for storing the characteristic information of partial area R(I), included in first area 1024 or second area 1025. When the characteristic information is stored, calculation unit 1033 transmits a signal indicating the end of determination to control unit 1035.

Figure 8:
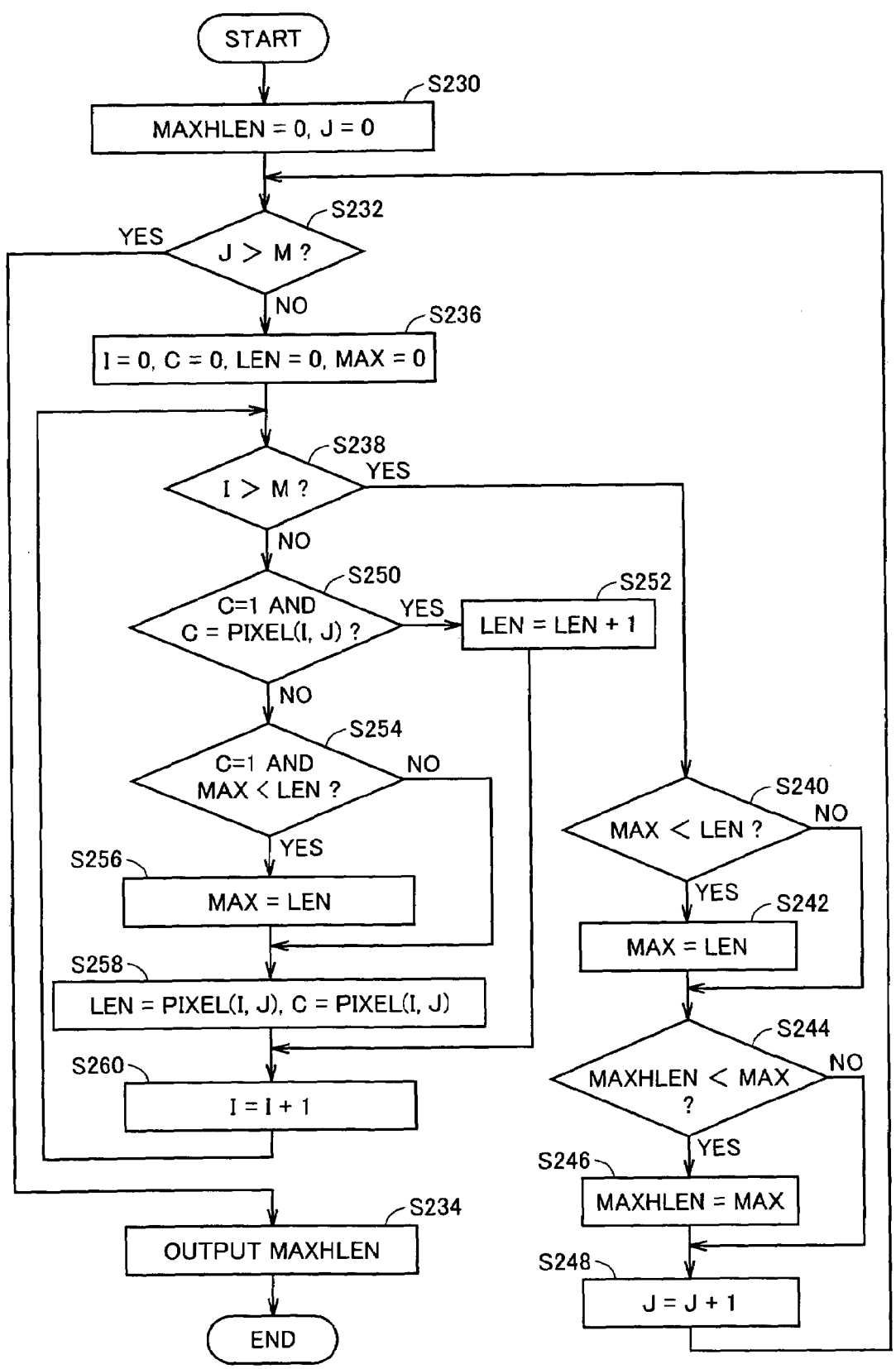
FIG. 8 is a flowchart showing a procedure for controlling maximum value MAXHLEN calculation processing according to the first embodiment of the present invention.

Referring to FIG. 8, the program executed in image collating apparatus 100 carries out control for calculating maximum value MAXHLEN as follows.

In S230, calculation unit 1033 initializes maximum value MAXHLEN and a counter variable J. Thus, MAXHLEN and J are set to 0 (MAXHLEN=0, J=0).

In S232, calculation unit 1033 determines whether relation of J>M is satisfied. Here, a constant M refers to the maximum value of the number of pixels constituting the partial area that are arranged in the horizontal direction or the maximum value of the number of pixels constituting the partial area that are arranged in the vertical direction. In the present embodiment, as the maximum value of the number of pixels arranged in the horizontal direction is equal to the maximum value of the number of pixels arranged in the vertical direction, the same variable represents the maximum value of the number of pixels arranged in the horizontal direction and the maximum value of the number of pixels arranged in the vertical direction. If it is determined that relation of J>M is satisfied (YES in S232), the process proceeds to S234. Otherwise (NO in S232), the process proceeds to S236.

In S234, calculation unit 1033 outputs the value represented by maximum value MAXHLEN to calculation block 1022.

In S236, calculation unit 1033 initializes a counter variable I, a variable C representing a color of the pixel, the number LEN of pixels adjacent to each other having the same color, and a maximum value MAX of the number of pixels adjacent to each other in a row or in a column and having the same color. Thus, I, C, LEN, and MAX are set to 0 (I=0, C=0, LEN=0, and MAX=0).

In S238, calculation unit 1033 determines whether relation of I>M is satisfied. If it is determined that relation of I>M is satisfied (YES in S238), the process proceeds to S240. Otherwise (NO in S238), the process proceeds to S250.

In S240, calculation unit 1033 determines whether relation of MAX<LEN is satisfied. If it is determined that relation of MAX<LEN is satisfied (YES in S240), the process proceeds to S242. Otherwise (NO in S240), the process proceeds to S244. In S242, calculation unit 1033 substitutes the number LEN of pixels into maximum value MAX.

In S244, calculation unit 1033 determines whether relation of MAXHLEN<MAX is satisfied. If it is determined that relation of MAXLEN<MAX is satisfied (YES in S244), the process proceeds to S246. Otherwise (NO in S244), the process proceeds to S248. In S246, calculation unit 1033 substitutes the value of maximum value MAX into maximum value MAXHLEN. In S248, calculation unit 1033 increases the value of counter variable J by "1".

In S250, calculation unit 1033 determines whether relation of C=1 and C=PIXEL (I,J) is satisfied. Here, variable C represents the color of the pixel, and variable PIXEL (I,J) represents the color of the pixel at a coordinate (I,J). If it is determined that relation of C=1 and C=PIXEL (I,J) is satisfied (YES in S250), the process proceeds to S252. Otherwise (NO in S250), the process proceeds to S254. In S252, calculation unit 1033 increases the value of the number LEN of the pixels by "1".

In S254, calculation unit 1033 determines whether relation of C=1 and MAX<LEN is satisfied. If it is determined that relation of C=1 and MAX<LEN is satisfied (YES in S254), the process proceeds to S256. Otherwise (NO in S254), the process proceeds to S258. In S256, calculation unit 1033 substitutes the value of the number LEN of pixels into maximum value MAX. In S258, calculation unit 1033 substitutes the value of variable PIXEL (I,J) into the number LEN of pixels. In addition, calculation unit 1033 substitutes the value of variable PIXEL (I,J) into variable C. In S260, calculation unit 1033 increases the value of counter variable I by "1".

Figure 9:
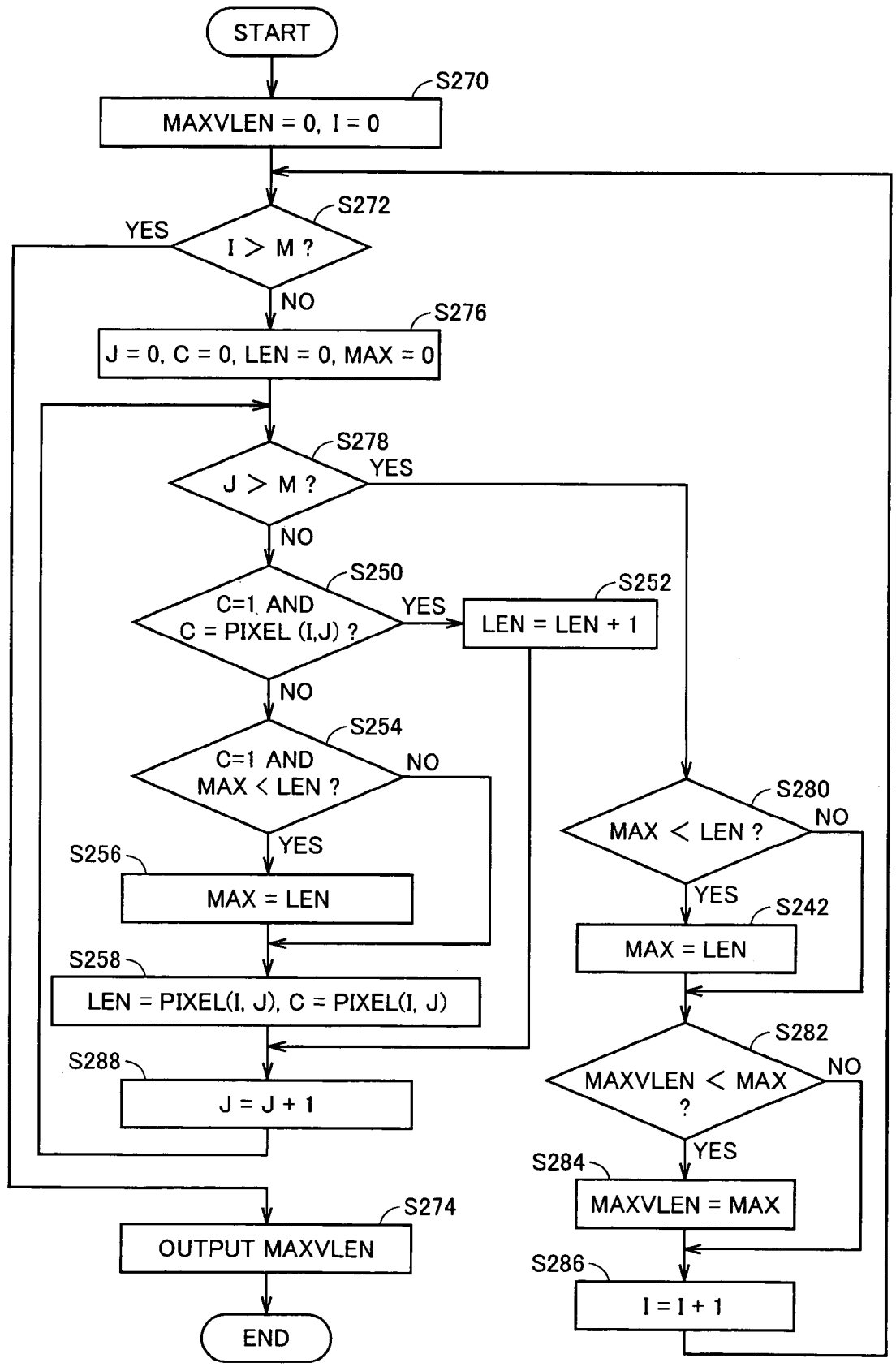
FIG. 9 is a flowchart showing a procedure for controlling maximum value MAXVLEN calculation processing according to the first embodiment of the present invention.

Referring to FIG. 9, the program executed in image collating apparatus 100 carries out control for calculating maximum value MAXVLEN as follows. It is noted that the processing in the flowchart in FIG. 9 that has been shown in FIG. 8 described previously is given the same step number, and the processing is also the same. Therefore, detailed description thereof will not be repeated.

In S270, calculation unit 1033 initializes maximum value MAXVLEN and counter variable I. Thus, MAXVLEN and I are set to 0 (MAXVLEN=0, I=0).

In S272, calculation unit 1033 determines whether relation of I>M is satisfied. If it is determined that relation of I>M is satisfied (YES in S272), the process proceeds to S274. Otherwise (NO in S272), the process proceeds to S276. In S274, calculation unit 1033 outputs the value represented by maximum value MAXVLEN to calculation block 1022.

In S276, calculation unit 1033 initializes counter variable J, variable C representing a color of the pixel, the number LEN of pixels adjacent to each other having the same color, and maximum value MAX of the number of pixels adjacent to each other in a row or in a column and having the same color. Thus, J, C, LEN, and MAX are set to 0 (J=0, C=0, LEN=0, and MAX=0).

In S278, calculation unit 1033 determines whether relation of J>M is satisfied. If it is determined that relation of J>M is satisfied (YES in S278), the process proceeds to S280. Otherwise (NO in S278), the process proceeds to S250.

In S280, calculation unit 1033 determines whether relation of MAX<LEN is satisfied. If it is determined that relation of MAX<LEN is satisfied (YES in S280), the process proceeds to S242. Otherwise (NO in S280), the process proceeds to S282.

In S282, calculation unit 1033 determines whether relation of MAXVLEN<MAX is satisfied. If it is determined that relation of MAXVLEN<MAX is satisfied (YES in S282), the process proceeds to S284. Otherwise (NO in S282), the process proceeds to S286. In S284, calculation unit 1033 substitutes the value of maximum value MAX into maximum value MAXVLEN. In S286, calculation unit 1033 increases the value of counter variable I by "1". In S288, calculation unit 1033 increases the value of counter variable J by "1".

Figure 10:
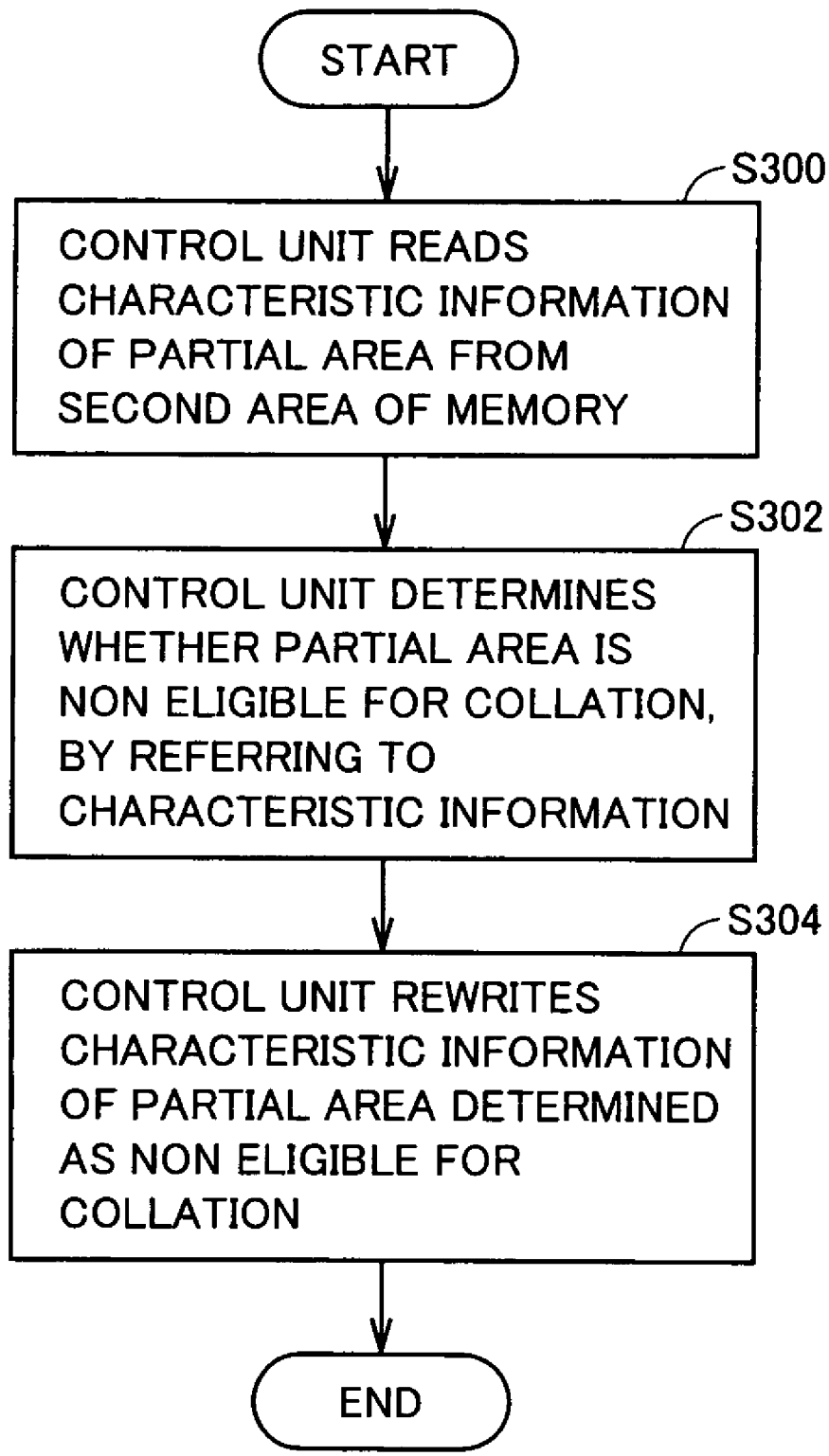
FIG. 10 is a flowchart showing a procedure for controlling characteristic information rewrite processing according to the first embodiment of the present invention.

Referring to FIG. 10, the program executed in image collating apparatus 100 carries out control for rewriting the characteristic information as follows.

In S300, control unit 1035 reads the characteristic information of partial area R(I) from the area storing the characteristic information of partial area R(I). The area storing the characteristic information of partial area R(I) is a part of first area 1024 or a part of second area 1025.

In S302, control unit 1035 determines whether partial area R(I) is non eligible for collation. In the present embodiment, "collation" refers to determination as to a possibility that the partial area matches with any portion of the template image. In the present embodiment, control unit 1035 determines as non eligible for collation, partial area R(I) having the characteristic information "X" or "E" (meaning of "E" will be described later), of which adjacent partial area also has the characteristic information "X" or "E". Control unit 1035 thus detects as the excluded area, an area having the predetermined information as the characteristic information. In the present embodiment, the area non eligible for collation among the partial areas that are portions of the sensing image is referred to as the "excluded area". In order to determine whether an area is non eligible for collation, control unit 1035 refers to the characteristic information of partial area R(I), sequentially from R(1), R(2), R(3), and so on. If the characteristic information is determined as "X" or "E" (the partial area having the characteristic information "X" or "E" is referred to as the "partial area to be subjected to determination" in S300 to S304), control unit 1035 refers to the characteristic information of the partial areas that are arranged above, under, to the left of, to the right of, in the upper right of, in the lower right of, in the upper left of, and in the lower left of, the partial area to be subjected to determination (such a partial area is referred to as the "adjacent partial area" in S300 to S304), respectively. If the adjacent partial area has the characteristic information "X" or "E", control unit 1035 determines the partial area to be subjected to determination as the excluded area.

In S304, control unit 1035 rewrites characteristic information "X" of partial area R(I) to be subjected to determination with "E". In order to rewrite the characteristic information, control unit 1035 overwrites the area storing the characteristic information of partial area R(I) with "E" and stores the same. As can clearly be seen from the processing in S304, the partial area having the characteristic information "E" refers to the partial area determined to have the characteristic information "X" as a result of processing in S226 as well as to the partial area adjacent thereto.

Figure 11:
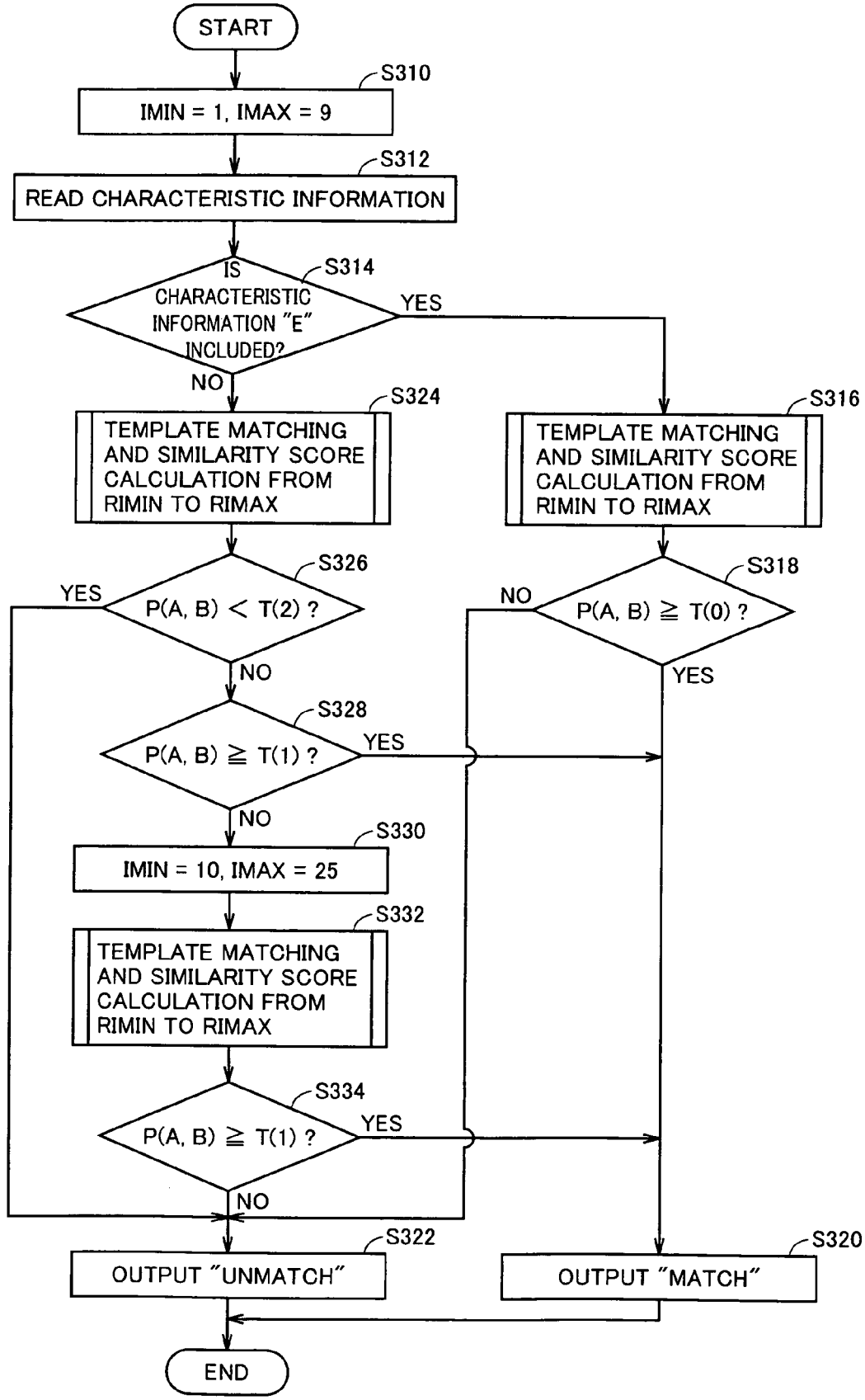
FIG. 11 is a flowchart showing a procedure for controlling similarity score calculation processing and collation determination processing according to the first embodiment of the present invention.

Referring to FIG. 11, the program executed in image collating apparatus 100 carries out control for similarity score calculation and collation determination as follows.

In S310, control unit 1035 sends a collation determination start signal to determination unit 1034. When the signal is transmitted, control unit 1035 waits until a collation determination end signal is received. Determination unit 1034 sets the central area in FIG. 2, that is, partial areas R(1) to R(9), as the partial area to be subjected to matching (similarity score calculation and collation determination). More specifically, determination unit 1034 sets an index minimum value IMIN of the partial area to "1". In the present embodiment, the "index" refers to suffix I of partial area R(I). When minimum value IMIN is set, determination unit 1034 sets an index maximum value IMAX of the partial area to "9". In setting the partial area to be subjected to matching in this step, the area should include a portion of a finger close to the distal interphalangeal joint rather than the tip end. Particularly, it is important to set the partial area such that the center of the arc of the fingerprint is included. This is because, if such a portion is set as the partial area, whether or not the fingerprints match with each other can readily be determined. The reason why matching can readily be determined is that difference between individuals in this portion is empirically significant. In the present embodiment, the total area of partial areas R(1) to R(9) occupies approximately 30% of the projection area of the finger in the sensing image. The reason why the area is determined as such is that it is empirically desirable for the total area of partial areas R(1) to R(9) to occupy 25 to 40% of the projection area of the finger in the sensing image.

In S312, determination unit 1034 reads the characteristic information from the area storing the characteristic information of partial area R(I). Here, the characteristic information of partial areas R(1) to R(9) is read.

In S314, determination unit 1034 determines whether characteristic information "E" is present among the characteristic information read in S312. In the present embodiment, the partial area having the characteristic information "E" is the excluded area. If it is determined that "E" is present (YES in S314), the process proceeds to S316. Otherwise (NO in S314), the process proceeds to S324.

In S316, search unit 1032 or the like skips the process for partial areas R(1) to R(9) and carries out matching and similarity score calculation with regard to the partial area reset by determination unit 1034. This processing corresponds to the processing in S340 to S380 shown in FIG. 12.

In S318, determination unit 1034 determines whether a maximum value P(A,B) of the similarity score stored at a prescribed address in storage unit 102 is equal to or greater than a predetermined threshold value T(0). If it is determined that maximum value P(A,B) is equal to or greater than threshold value T(0) (YES in S318), the process proceeds to S320. Otherwise (NO in S318), the process proceeds to S322. If the partial area in the first portion includes the excluded area, determination unit 1034 determines whether there is a probability that the partial area other than the excluded area matches with the template image, based on the similarity score.

In S320, determination unit 1034 outputs information indicating "match" (for example, a value of "1") to reference block 1021. In S322, determination unit 1034 outputs information indicating "unmatch" (for example, a value of "0") to reference block 1021.

In S324, search unit 1032 or the like carries out matching and similarity score calculation with regard to the partial area set by determination unit 1034. This processing corresponds to the processing in S342 to S380 and the processing in S400 to S410 shown in FIG. 13.

In S326, calculation unit 1033 stores the value of maximum value P(A,B) of the similarity score at a prescribed address in memory 102. When the value is stored, calculation unit 1033 transmits a similarity score calculation end signal to control unit 1035. Determination unit 1034 determines whether maximum value P(A,B) of the similarity score is smaller than a threshold value T(2). If it is determined that maximum value P(A,B) is smaller than threshold value T(2) (YES in S326), the process proceeds to S322. Otherwise (NO in S326), the process proceeds to S328. As a result of this processing, if all the partial areas in the first portion are the considered areas, determination unit 1034 determines whether there is a probability that the first portion matches with any portion of the template image.

In S328, determination unit 1034 determines whether maximum value P(A,B) of the similarity score is equal to or greater than a threshold value T(1), which is greater than threshold value T(2). If it is determined that maximum value P(A,B) is equal to or greater than threshold value T(1) (YES in S328), the process proceeds to S320. Otherwise (NO in S328), the process proceeds to S330. Thus, determination unit 1034 determines whether there is a probability that the considered area matches with any portion of the template image, based on the similarity score.

Figures 2, 3:
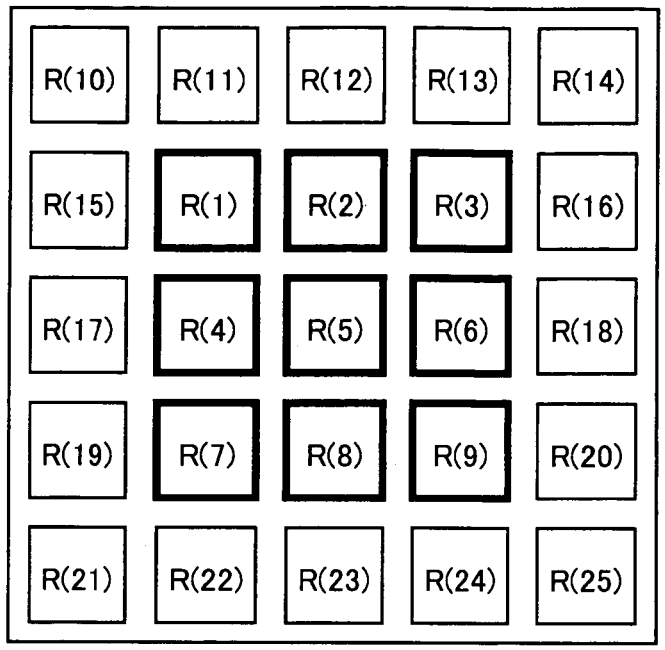
FIG. 2 illustrates arrangement of partial areas in an image according to the first embodiment of the present invention.
FIG. 3 illustrates relation of arrangement and denotation of the partial areas according to the first embodiment of the present invention.

In S330, determination unit 1034 sets the peripheral area in FIG. 2, that is, partial areas R(10) to R(25), as the partial area to be subjected to matching. More specifically, determination unit 1034 sets index minimum value IMIN of the partial area to "10". In addition, determination unit 1034 sets index maximum value IMAX of the partial area to "25".

In S332, search unit 1032 or the like carries out matching and similarity score calculation with regard to the partial area set by determination unit 1034. The processing corresponds to the processing in S342 to S380 and the processing in S400 to S410 shown in FIG. 13.

In S334, determination unit 1034 determines whether maximum value P(A,B) of the similarity score is equal to or greater than threshold value T(1). If it is determined that maximum value P(A,B) is equal to or greater than threshold value T(1) (YES in S334), the process proceeds to S320. Otherwise (NO in S334), the process proceeds to S332. Thus, determination unit 1034 determines whether the partial area other than the excluded area in the sensing image matches with any portion of the template image, when there is a probability that the first portion matches with any portion of the template image. This is because whether the first portion matches with any portion of the template image has been determined in the processing in S324 to S328.

Figure 12:
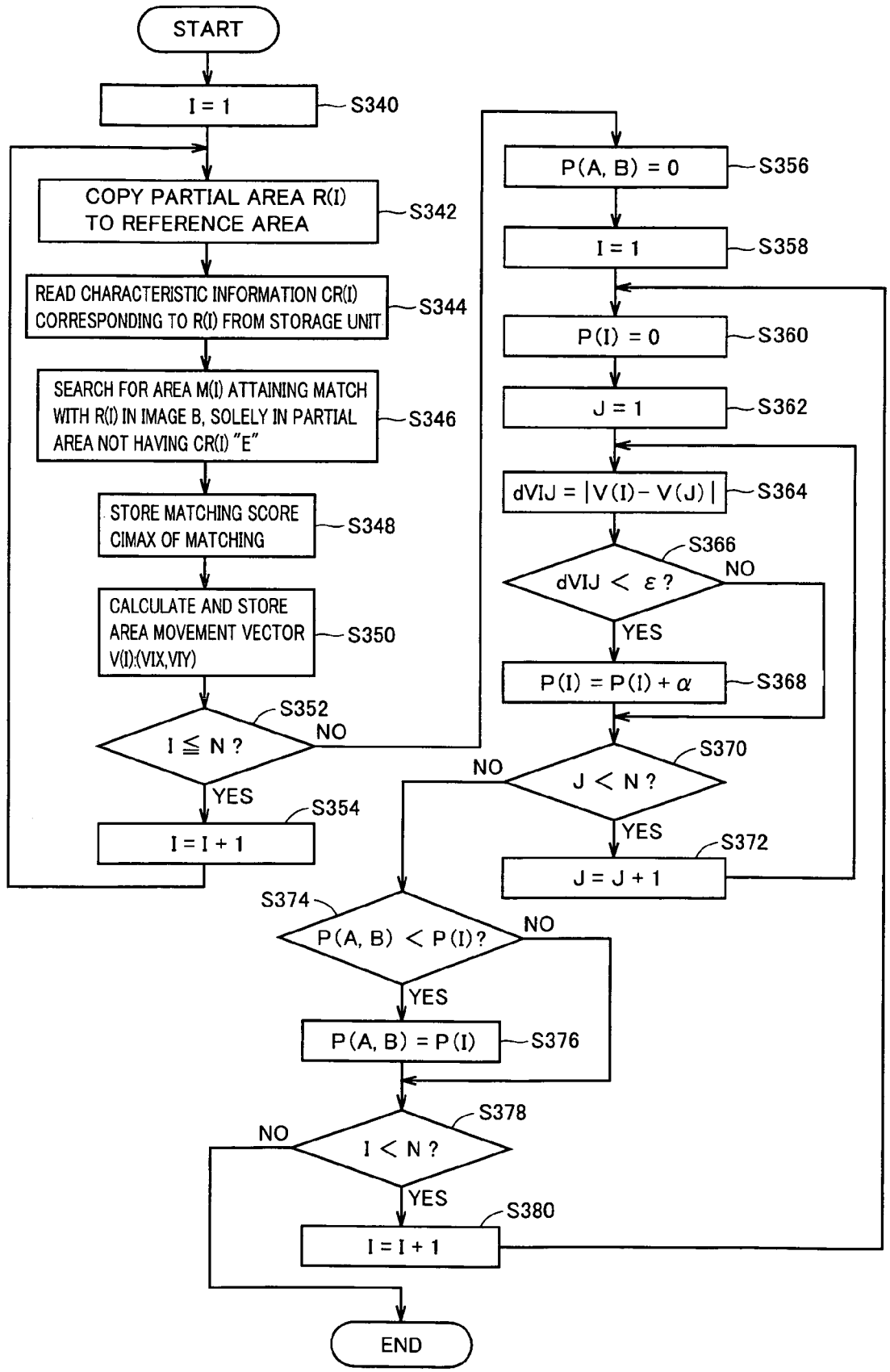
FIG. 12 is a flowchart showing a procedure for controlling matching and similarity score calculation processing according to the first embodiment of the present invention.

Referring to FIG. 12, the program executed in image collating apparatus 100 carries out control for matching and similarity score calculation as follows.

In S340, control unit 1035 sends a matching start signal to search unit 1032. Thereafter, control unit 1035 waits until a matching end signal is received. Search unit 1032 sets the value of counter variable I to "1".

In S342, search unit 1032 copies the image of partial area R(I) in the sensing image to reference block 1021. The shape of partial area R(I) is not particularly specified. In the present embodiment, it is assumed that partial area R(I) has a rectangular shape, because calculation is facilitated. In addition, partial area R(I) in the present embodiment refers to such an area that a line traversing partial area R(I) and extending orthogonal to the ridge (line forming the pattern of the fingerprint) is at least twice and at most three times as long as the sum of the width of the ridge and the width of a ridge recess (recess between the ridges). The reason why the shape of the partial area is set as such is that it is empirically clear that the fingerprint can be collated with high accuracy. If the shape of the partial area is set in this manner, the average value of the width of the ridge or the width of the recess between the ridges, that has been measured in advance, serves as the basis for the size of the partial area.

In S344, search unit 1032 reads characteristic information CR(I) of partial area R(I) from storage unit 102. When variable I has a value in a range from "1" to "9", characteristic information CR(I) is read from first area 1024. If variable I has a value other than these, characteristic information CR(I) is read from second area 1025.

In S346, search unit 1032 searches for a location attaining the highest matching score within the image, in the image copied in S342, because the location attaining the highest matching score within the image is also the location at which data within the image attains the best match. Here, searching is carried out in a portion not having characteristic information CR(I) determined as "E", among the partial areas. Search unit 1032 calculates a matching score C(I,S,T). Here, the "matching score" refers to a value representing a probability that the partial area other than the excluded area in the sensing image matches with any portion of the template image. When matching score C(I,S,T) is calculated, search unit 1032 stores the value of matching score C(I,S,T) in reference block 1021, in association with counter variable I and a coordinate (S,T) of the template image. In calculating matching score C(I,S,T), the following equation is used.

$$C(I, S, T) = \sum_{Y=1}^{H} \sum_{X=1}^{W} (V(0) - |R(I, X, Y) - B(S + X, T + Y)|) \quad (1)$$

Here, R(I,X,Y) represents the value of density of the pixel at coordinate (X,Y) in partial area R(I). B(S+X,T+Y) represents the value of density of the pixel at coordinate (S+X,T+Y) in the template image. If coordinate (S+X,T+Y) exceeds the maximum value of the coordinate of the template image, the value of B(S+X,T+Y) is set to "0". W and H represent a width and a height of partial area R(I) respectively. V(0) represents the maximum density value of each pixel in the sensing image and the template image. As described above, matching score C(I,S,T) represents the probability of matching between the area having width W and height H in the template image with coordinate (S,T) being as origin and partial area R(I). In partial area R(I), partial area M(I) has the highest matching score C(I,S,T). In the present embodiment, the coordinate of partial area R(I) and the coordinate of the template image are both represented with the upper left vertex being the origin.

In S348, search unit 1032 causes storage unit 102 to store a maximum value CIMAX of matching score C(I,S,T) calculated in S346. In S346, matching score C(I,S,T) is calculated for each coordinate (S,T) of image B, in the same partial area R(I). As matching score C(I,S,T) is calculated for each coordinate (S,T) of image B, search unit 1032 can specify maximum value CIMAX from among all calculated matching scores C(I,S,T). If variable I has a value in a range from "1" to "9", maximum value CIMAX is stored in first area 1024. Otherwise, maximum value CIMAX is stored in second area 1025.

In S350, search unit 1032 calculates a movement vector V(I). When movement vector V(I) is calculated, search unit 1032 causes storage unit 102 to store movement vector V(I). If the value "I" is in a range from "1" to "9", movement vector V(I) is stored in first area 1024. Otherwise, movement vector V(I) is stored in second area 1025. As can clearly be seen from equation (2), the "movement vector" refers to a directional vector from the upper left vertex of partial area R(I) to the upper left vertex of the area attaining the best match in the template image (partial area M(I)) when the upper left vertex of the sensing image is superimposed on the upper left vertex of the template image. In general, magnitude of movement vector V(I) is not "0", because the position of the fingerprint in the image is different between the sensing image and the template image. The reason why the position of the fingerprint is different is that the finger is placed in various manners on input unit 101. In calculating movement vector V(I), the following equation is used.

$$V(I)=(VIX, VIY)=(MIX-RIX, MIY-RIY) \quad (2)$$

Variables RIX and RIY represent x and y coordinates at the reference position of partial area R(I). In the present embodiment, (RIX,RIY) represents the coordinate in the upper left corner of partial area R(I) in the sensing image. Variables MIX and MIY represent x and y coordinates of partial area M(I). In the present embodiment, (MIX,MIY) represents the coordinate in the upper left corner of partial area M(I).

In S352, search unit 1032 determines whether the value of counter variable I is equal to or smaller than the total number N of the partial areas. If it is determined that the value of counter variable I is equal to or smaller than the total number N (YES in S352), the process proceeds to S354. Otherwise (NO in S352), the process proceeds to S356. In S354, search unit 1032 increases the value of counter variable I by "1".

In S356, search unit 1032 transmits a matching end signal to control unit 1035. Control unit 108 transmits a signal instructing start of similarity score calculation to calculation unit 1033. When the signal is transmitted, control unit 1035 waits until the similarity score calculation end signal is received. When the signal instructing start of similarity score calculation is received, calculation unit 1033 initializes maximum value P(A,B) of the similarity score to "0". In the present embodiment, maximum value P(A,B) of the similarity score is a variable storing the maximum value of the similarity score between the sensing image and the template image.

In S358, calculation unit 1033 initializes the value of counter variable I to "1". In S360, calculation unit 1033 initializes a similarity score P(I) as to reference movement vector V(I) to "0". In S362, calculation unit 1033 initializes the value of counter variable J to "1".

In S364, calculation unit 1033 calculates a vector difference dVIJ between reference movement vector V(I) and a movement vector V(J) to be compared, in accordance with the following equation.

$$dVIJ = |V(I) - V(J)| \quad (3)$$
$$= SQRT(F)$$
$$= SQRT((VIX - VJX)^2 + (VIY - VJY)^2)$$

Variables VIX and VIY represent x direction and y direction components of movement vector V(I) respectively. Variables VJX and VJY represent x direction and y direction components of movement vector V(J) respectively. Function SQRT(F) represents square root of value F.

In step S366, calculation unit 1033 determines whether movement vectors V(I) and V(J) are substantially the same. Specifically, calculation unit 1033 determines whether vector difference dVIJ is smaller than a constant ε. If it is determined that the movement vectors are substantially the same (YES in S366), the process proceeds to step S368. Otherwise (NO in S366), the process proceeds to step S370.

In S368, calculation unit 1033 increases the value of similarity score P(I) in accordance with the following equation. Thus, calculation unit 1033 calculates the similarity score between at least a part of the sensing image and at least a part of the template image, based on positional relation between each considered area and each portion searched for by search unit 1032.

$$P(I)=P(I)+\alpha \quad (4)$$

A variable α represents a value for increasing similarity score P(I). In the present embodiment, variable α can be set to any value at the time of design, such that it corresponds to magnitude of vector difference dVIJ. For example, if α is set to 1 (α=1), the value of similarity score P(I) represents the number of partial areas having the movement vector the same as reference movement vector V(I). As the number of partial areas having the movement vector the same as reference movement vector V(I) is represented, when α is set to 1 (α=1), calculation unit 1033 calculates the number of partial areas as the similarity score, the partial area satisfying a prescribed requirement of positional relation between a plurality of partial areas and the portion searched for by search unit 1032. If α is set to CIMAX (α=CIMAX), similarity score P(I) represents the total sum of maximum matching score CIMAX.

In S370, calculation unit 1033 determines whether counter variable J is smaller than the total number N of partial areas. If it is determined that counter variable J is smaller than the total number N of partial areas (YES in S370), the process proceeds to S372. Otherwise (NO in S370), the process proceeds to S374.

In S372, calculation unit 1033 increases the value of counter variable J by "1".

In S374, calculation unit 1033 determines whether similarity score P(I) as to movement vector V(I) is greater than maximum value P(A,B) of the similarity score. If it is determined that similarity score P(I) is greater than maximum value P(A,B) of the similarity score (YES in S374), the process proceeds to S376. Otherwise (NO in S374), the process proceeds to S378.

In S376, calculation unit 1033 substitutes the value of similarity score P(I) as to movement vector V(I) into maximum value P(A,B) of the similarity score.

In S378, calculation unit 1033 determines whether the value of counter variable I is smaller than the total number N of partial areas. If it is determined that the value of counter variable I is smaller than the total number N of partial areas (YES in S378), the process proceeds to S380. Otherwise (NO in S378), the process ends. In S380, calculation unit 1033 increases the value of counter variable I by "1".

Figure 13:
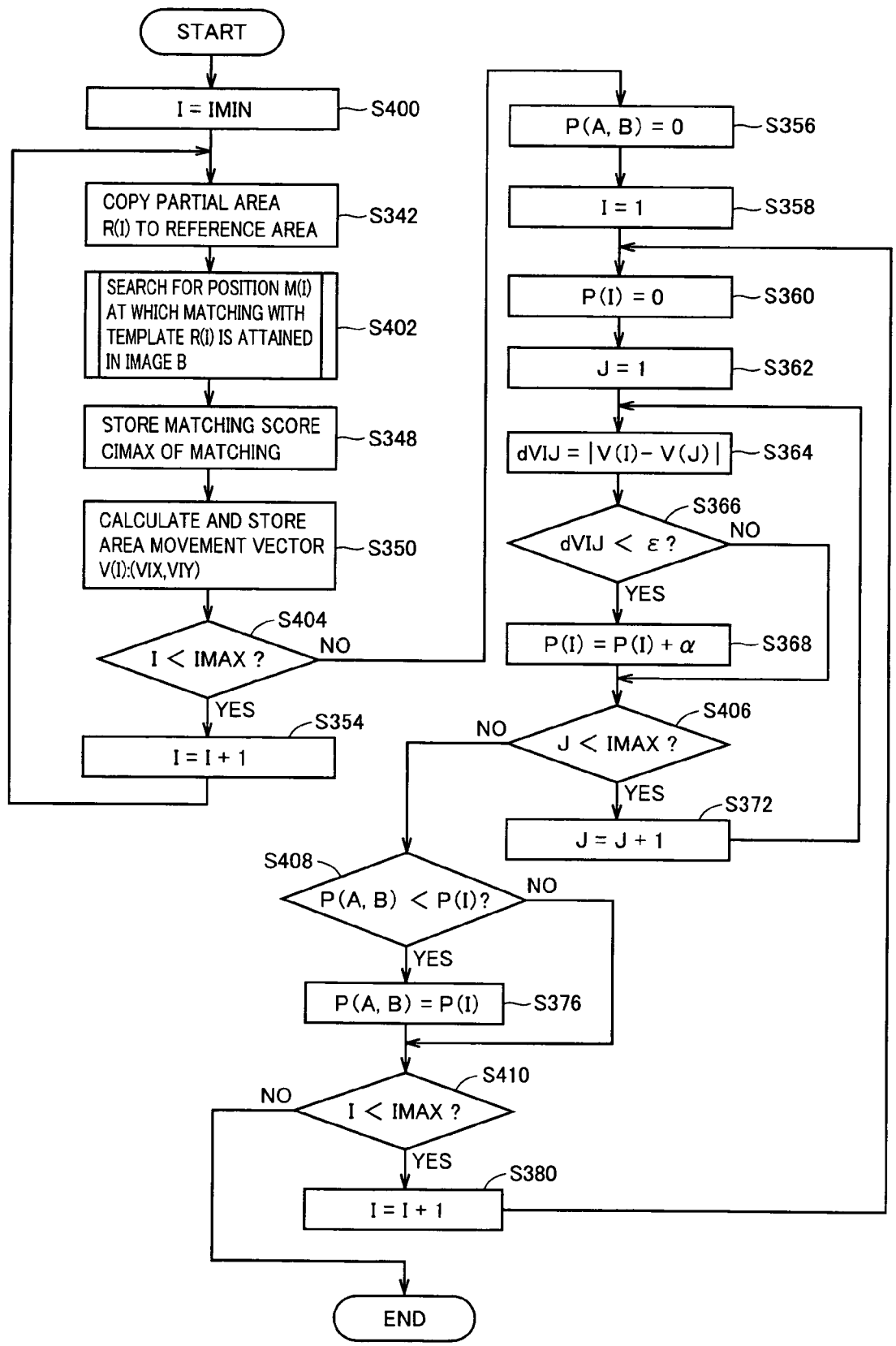
FIG. 13 is a flowchart showing a procedure for controlling similarity score calculation processing when a partial area determined as non eligible for collation is present, according to the first embodiment of the present invention.

Referring to FIG. 13, the program executed in image collating apparatus 100 carries out control for similarity score calculation as follows. It is noted that the processing in the flowchart in FIG. 13 that has been shown in FIG. 12 described previously is given the same step number, and the processing is also the same. Therefore, detailed description thereof will not be repeated.

In S400, control unit 1035 sends a matching start signal to search unit 1032. Thereafter, control unit 1035 waits until a matching end signal is received. Search unit 1032 substitutes above-described index minimum value IMIN into counter variable I.

In S402, search unit 1032 searches for an area attaining the highest matching score within the template image, that is, an area where data within the image attains the best match, in partial area R(I) of which image was copied in S342. Maximum matching score CIMAX for partial area R(I) copied in S342 is thus calculated. This processing corresponds to the processing in S420 to S426 shown in FIG. 14.

In S404, search unit 1032 determines whether the value of counter variable I is smaller than index maximum value IMAX of the considered partial area. If it is determined that the value of counter variable I is smaller than maximum value IMAX (YES in S404), the process proceeds to S354. Otherwise (NO in S404), the process proceeds to S356.

In S406, calculation unit 1033 determines whether counter variable J is smaller than index maximum value IMAX of the partial area. If it is determined that counter variable J is smaller than maximum value IMAX (YES in S406), the process proceeds to S372. Otherwise (NO in S406), the process proceeds to S408.

In S408, calculation unit 1033 determines whether similarity score P(I) as to movement vector V(I) is greater than maximum value P(A,B) of the similarity score. If it is determined that similarity score P(I) is greater than maximum value P(A,B) of the similarity score (YES in S408), the process proceeds to S376. Otherwise (NO in S408), the process proceeds to S410.

In S410, calculation unit 1033 determines whether the value of counter variable I is smaller than index maximum value IMAX of the partial area. If it is determined that the value of counter variable I is smaller than index maximum value IMAX (YES in S410), the process proceeds to S380. Otherwise (NO in S410), the process ends.

Figure 14:
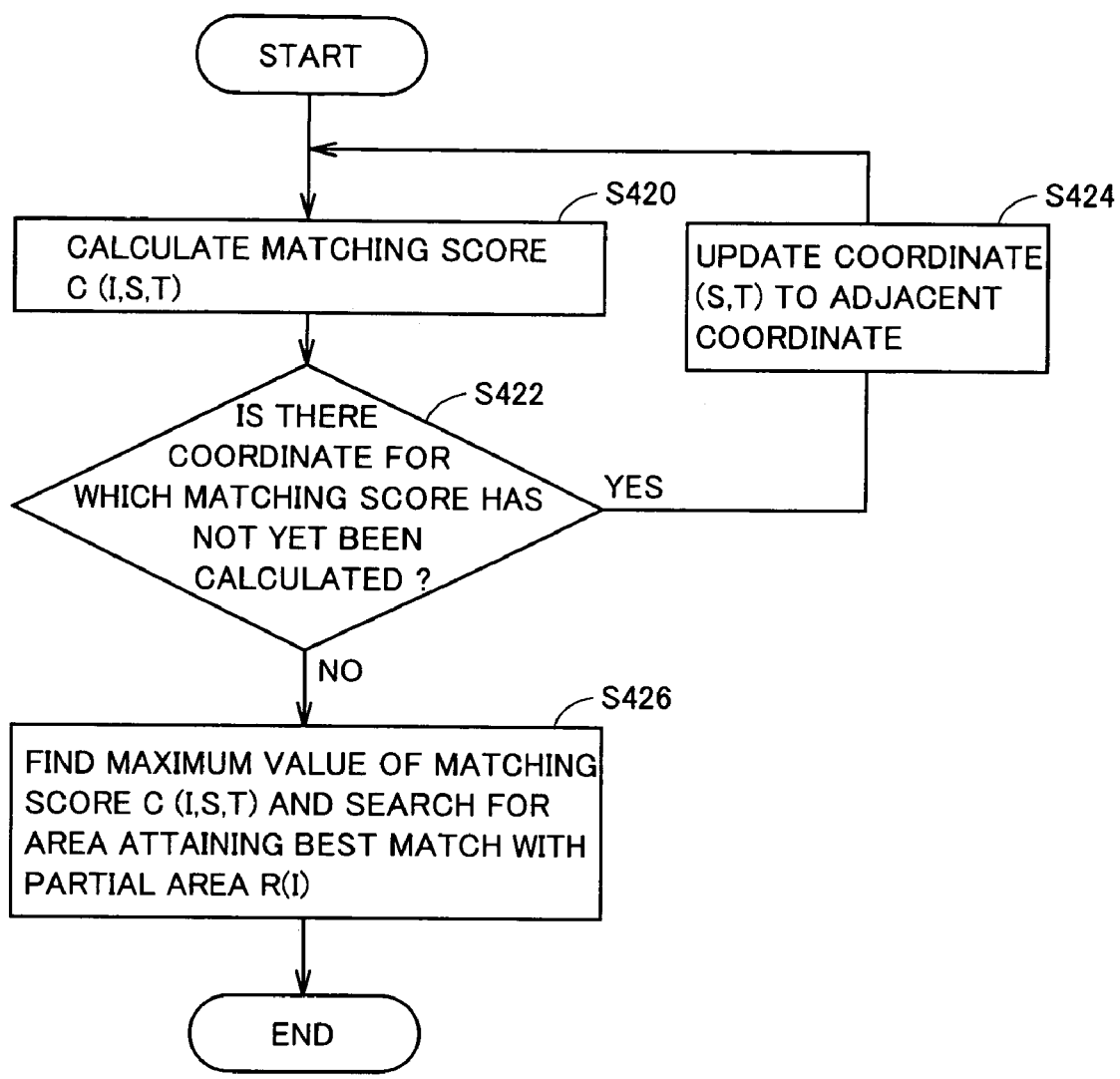
FIG. 14 is a flowchart showing a procedure for controlling matching score calculation processing according to the first embodiment of the present invention.

Referring to FIG. 14, the program executed in image collating apparatus 100 carries out control for searching for area M(I), that is, for calculating the matching score, as follows.

In S420, search unit 1032 calculates matching score C(I,S,T), using the equation the same as in S346. When matching score C(I,S,T) is calculated, search unit 1032 stores the value of matching score C(I,S,T) in reference block 1021, in association with counter variable I and coordinate (S,T) of image B.

In S422, search unit 1032 determines whether there is a coordinate for which matching score C(I,S,T) has not yet been calculated, among the coordinates of the template image. If it is determined that there is a coordinate for which matching score C(I,S,T) has not yet been calculated (YES in S422), the process proceeds to S424. Otherwise (NO in S422), the process proceeds to S426.

In S424, search unit 1032 updates coordinate (S,T) of the template image to a coordinate adjacent to the coordinate for which matching score C(I,S,T) has been calculated in S422. In the present embodiment, if there is not an adjacent coordinate, search unit 1032 updates coordinate (S,T) of the template image to a coordinate directly under the coordinate for which matching score C(I,S,T) has been calculated in S422. In the present embodiment, the initial value for coordinate (S,T) is set to (0,0). The coordinate (0,0) represents the coordinate in the upper left of the template image.

In S426, search unit 1032 searches for the maximum value among matching scores C(I,S,T) stored in reference block 1021. When maximum variable CIMAX of matching score C(I,S,T) is searched for, search unit 1032 assumes the following area as the area attaining the highest matching score with partial area R(I). Specifically, the area is an area having width W and height H, with the coordinate for which maximum variable CIMAX has been calculated as origin, among coordinates (S,T) of the template image. It is noted that the area assumed to attain the highest matching score with partial area R(I) is referred to as partial area M(I).

An operation of image collating apparatus 100 based on the configuration and the flowchart as above will now be described.

[Example in Which the Partial Area Having the Characteristic Information "E" is Present and the Value of HLEN(0) is Set to "2"]

An operation of image collating apparatus 100 when the value of HLEN(0) is set to "2" will now be described.

Figure 15:
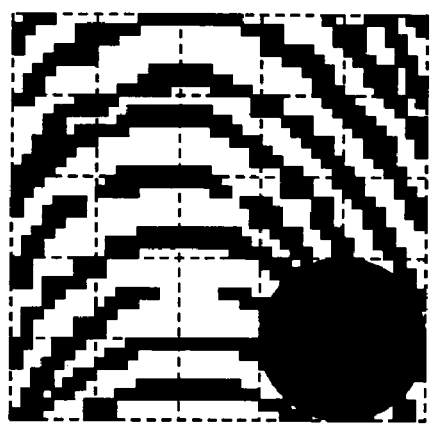
FIG. 15 illustrates a sensing image according to the first embodiment of the present invention.
Figure 16:
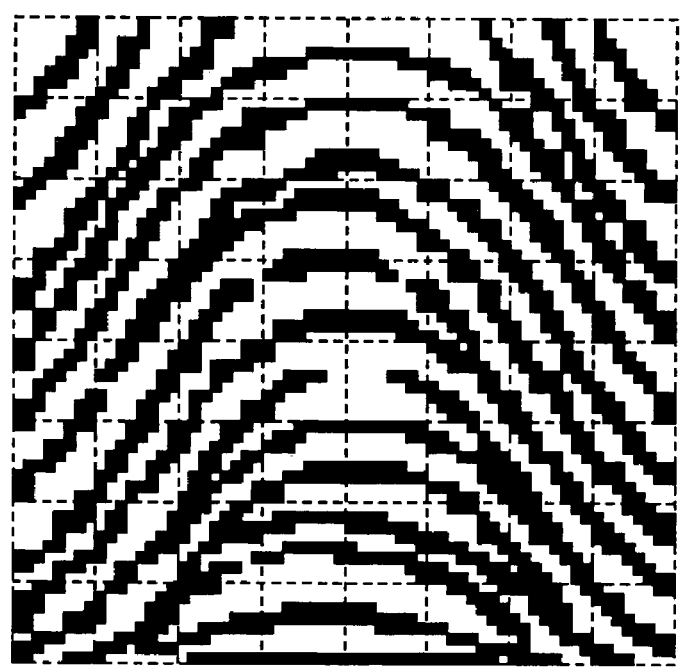
FIG. 16 illustrates an exemplary template image according to the first embodiment of the present invention.

Control unit 1035 sends the image input start signal to input unit 101. Input unit 101 accepts input of the sensing image, and outputs the sensing image to image block 1023 in storage unit 102 through bus 105. Reference block 1021 stores the image data of the sensing image. FIG. 15 illustrates an exemplary sensing image input at this time. There is a blur seen in the lower right portion of the image. Input unit 101 accepts the input of the template image, and outputs the same to image block 1023 in storage unit 102 through bus 105. Image block 1023 stores the image data of the template image. FIG. 16 illustrates an exemplary template image input at this time. After acceptance of the template image is completed, input unit 101 sends an image acceptance end signal to control unit 1035 (S200).

When the signal is sent, control unit 1035 sends the image correction start signal to correction unit 1031. Correction unit 1031 corrects the image quality of input image to suppress variations of conditions when the image is input. After correction ends, correction unit 1031 sends the image correction end signal to control unit 1035 (S202).

When the signal is sent, control unit 1035 sends a signal instructing start of determination to calculation unit 1033. Calculation unit 1033 reads partial area R(1) to be subjected to determination from image block 1023, and once stores the same in calculation block 1022 (S210).

When partial area R(I) is stored, calculation unit 1033 initializes maximum value MAXHLEN and counter variable J (S230).

When maximum value MAXHLEN and counter variable J are initialized, calculation unit 1033 determines whether relation of J>M is satisfied (S232). Here, as the value of constant M is set to "15" and the value of counter variable J is set to "0" (NO in S232), calculation unit 1033 initializes counter variable I, variable C, the number LEN of pixels, and maximum value MAX (S236). Thus, I, C, LEN, and MAX are set to 0 (I=0, C=0, LEN=0, and MAX=0).

When counter variable I and the like are initialized, calculation unit 1033 determines whether relation of I>M is satisfied (S238). Here, as the value of constant M is set to "15" and the value of counter variable I is set to "0" (NO in S238), calculation unit 1033 determines whether relation of C=1 and C=PIXEL (I,J) is satisfied (S250). Here, as C is set to 0 (C=0) in S236 (NO in S250), calculation unit 1033 determines whether relation of C=1 and MAX<LEN is satisfied (S254). Here, as C, LEN and MAX are set to 0 (C=0, LEN=0 and MAX=0) (NO in S254), calculation unit 1033 substitutes the value of variable PIXEL (I,J) into the number LEN of pixels. In addition, calculation unit 1033 substitutes the value of variable PIXEL (I,J) into variable C (S258). Here, when relation of PIXEL (0,0)=0 is satisfied, both the value of the number LEN of pixels and the value of variable C remain at "0".

When the value of variable PIXEL (I,J) is substituted into variable C, calculation unit 1033 increases the value of counter variable I by "1" (S260). Thus, the value of counter variable I is set to "1". If it is assumed that the color of all pixels in the first line is white (that is, the values of PIXEL (I,0) are all set to "0"), the processing in S238 to S260 is repeated until the value of counter variable I is set to "16". It is assumed that the values of PIXEL (16,J) and PIXEL (I,16) are defined in advance as "0". As to the value of counter variable I and the like at the time point when the value of counter variable I is set to "16", I is set to 15 and C and LEN are set to 0 (I=15, C=0, and LEN=0).

After the processing in S238 to S260 is repeated, calculation unit 1033 determines whether relation of I>M is satisfied (S238). Here, as the value of constant M is set to "15" and the value of counter variable I is set to "16" (YES in S238), calculation unit 1033 determines whether relation of MAX<LEN is satisfied (S240). Here, as C, LEN and MAX are set to 0 (C=0, LEN=0 and MAX=0) (NO in S240), calculation unit 1033 determines whether relation of MAXHLEN<MAX is satisfied (S244). Here, as MAXHLEN and MAX are set to 0 (MAXHLEN=0, MAX=0) (NO in S244), calculation unit 1033 increases the value of counter variable J by "1" (S248). Thus, the value of counter variable J is set to "1". Thereafter, while the value of counter variable J is in a range from "1" to "15", the processing in S232 to S248 is repeated.

Thereafter, at the time point when the value of counter variable J is set to "16", calculation unit 1033 determines whether relation of J>M is satisfied (S232). Here, as the value of counter variable J is set to "16" and the value of constant M is set to "15" (YES in S232), calculation unit 1033 outputs the value represented by maximum value MAXHLEN to calculation block 1022 (S234). Here, it is assumed that "15" is output as the value of maximum value MAXHLEN.

When the value represented by maximum value MAXHLEN is output, calculation unit 1033 initializes maximum value MAXVLEN and counter variable I (S270). Thus, MAXVLEN and I are set to 0 (MAXVLEN=0, I=0).

When maximum value MAXVLEN and counter variable I are initialized, calculation unit 1033 determines whether relation of I>M is satisfied (S272). Here, as the value of counter variable I is set to "0" and the value of constant M is set to "15" (YES in S272), calculation unit 1033 initializes counter variable J, variable C representing a color of the pixel, the number LEN of pixels adjacent to each other having the same color, and maximum value MAX of the number of pixels adjacent to each other in a row or in a column and having the same color (S276). Thus, J, C, LEN, and MAX are set to 0 (J=0, C=0, LEN=0, and MAX=0).

When counter variable J and the like are initialized, calculation unit 1033 determines whether relation of J>M is satisfied (S278). Here, as the value of counter variable J is set to "0" and the value of constant M is set to "15" (NO in S278), calculation unit 1033 determines whether relation of C=1 and C=PIXEL (I,J) is satisfied (S250). Here, as C is set to 0 (C=0) (NO in S250), calculation unit 1033 determines whether relation of C=1 and MAX<LEN is satisfied (S254). Here, as C, LEN and MAX are set to 0 (C=0, LEN=0 and MAX=0) (NO in S254), calculation unit 1033 substitutes the value of variable PIXEL (I,J) into the number LEN of pixels. In addition, calculation unit 1033 substitutes the value of variable PIXEL (I,J) into variable C (S258).

When the value of the number LEN of pixels is increased by "1", calculation unit 1033 increases the value of counter variable J by "1" (S288). Thus, the value of counter variable J is set to "1". When the value of counter variable J is increased by "1", the processing in S278 to S288 is repeated until the value of counter variable J is set to "3". It is assumed here that, as to the value of counter variable J and the like at the time point when the value of counter variable J is set to "3", J is set to 3 and C and LEN are set to 0 (J=3, C=0, and LEN=0).

Thereafter, calculation unit 1033 determines whether relation of J>M is satisfied (S278). Here, as the value of constant M is set to "15" and the value of counter variable J is set to "3" (NO in S278), calculation unit 1033 determines whether relation of C=1 and C=PIXEL (I,J) is satisfied (S250). Here, as C is set to 0 (C=0) (NO in S250), calculation unit 1033 determines whether relation of C=1 and MAX<LEN is satisfied (S254). Here, as C and LEN are set to 0 (C=0, LEN=0) (NO in S254), calculation unit 1033 substitutes the value of variable PIXEL (I,J) into the number LEN of pixels. In addition, calculation unit 1033 substitutes the value of variable PIXEL (I,J) into variable C (S258). Thus, LEN and C are set to 1 (LEN=1, C=1).

When the value is substituted into the number LEN of pixels and the like, the processing in S278 to S288 is repeated until the value of counter variable J is set to "16". It is assumed here that, as to the value of counter variable J and the like at the time point when the value of counter variable J is set to "16", J is set to 16 and C and LEN are set to 1 (J=16, C=1, and LEN=1).

Thereafter, calculation unit 1033 determines whether relation of J>M is satisfied (S278). Here, as the value of constant M is set to "15" and the value of counter variable J is set to "16" (YES in S278), calculation unit 1033 determines whether relation of MAX<LEN is satisfied (S280). Here, if C and LEN are set to 1 and MAX is set to 3 (C=1, LEN=1, and MAX=3) (NO in S280), calculation unit 1033 determines whether relation of MAXVLEN<MAX is satisfied (S282). Here, if MAXVLEN is set to 0 and MAX is set to 3 (MAX- VLEN=0, MAX=3) (YES in S282), calculation unit 1033 substitutes the value of maximum value MAX into maximum value MAXVLEN (S284). When the value is substituted, calculation unit 1033 increases the value of counter variable I by "1" (S286). The value of counter variable I is set to "1". Thereafter, while the value of counter variable I is in a range from "1" to "15", the processing in S272 to S288 is repeated.

Thereafter, at the time point when the value of counter variable I is set to "16", calculation unit 1033 determines whether relation of I>M is satisfied (S272). At this time point, as the value of counter variable I is set to "16" and the value of constant M is set to "15" (YES in S272), calculation unit 1033 outputs the value represented by maximum value MAXVLEN to calculation block 1022 (S274). Here, it is assumed that "4" is output as the value of maximum value MAXVLEN.

When the value represented by maximum value MAXVLEN is output, calculation unit 1033 determines whether relation of MAXHLEN>MAXVLEN and MAXHLEN≧HLEN(0) is satisfied (S216). Here, as MAXHLEN is set to 15, MAXVLEN is set to 4, and HLEN(0) is set to 2 (MAXHLEN=15, MAXVLEN=4, and HLEN(0)=2) (YES in S216), calculation unit 1033 stores "H" in an area for storing the characteristic information of partial area R(I), included in first area 1024 or second area 1025. When the characteristic information is stored, calculation unit 1033 transmits a signal indicating end of determination to control unit 1035 (S218).

Figures 17, 18, 19:
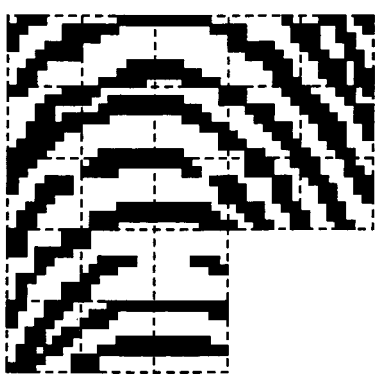
FIG. 17 illustrates exemplary characteristic information according to the first embodiment of the present invention, in association with arrangement of the partial areas.
FIG. 18 illustrates exemplary characteristic information of which value has been rewritten according to the first embodiment of the present invention, in association with arrangement of the partial areas.
FIG. 19 is a conceptual view of an input image from which the partial area determined as non eligible for collation has been removed, according to the first embodiment of the present invention.

The processing in S210 to S226 is repeated for each partial area. FIG. 17 illustrates exemplary characteristic information read from first area 1024 or second area 1025 of storage unit 102, in association with arrangement of each partial area. Thus, calculation unit 1033 extracts (specifies) each pixel column in the horizontal direction and vertical direction for each partial area, and determines tendency based on the number of black pixels in each extracted pixel column. The term "tendency" herein refers to any one of tendency that the pattern of the partial areas extends along the horizontal direction (for example, the tendency toward lateral stripe), tendency that the pattern of the partial areas extends along the vertical direction (for example, the tendency toward vertical stripe), and tendency corresponding to none of the former. Calculation unit 1033 outputs information in accordance with the result of determination of the tendency (any one of "R", "L", "V", and "X"). This value indicates the characteristic information of the partial area.

When the characteristic information of each partial area is stored, control unit 1035 reads the characteristic information of partial area R(I) from the area storing the characteristic information of partial area R(I) (S300).

When the characteristic information is read, control unit 1035 determines whether the partial area is non eligible for collation (S302). In the case of FIG. 17, the characteristic information of R(9) has been determined as "X". Control unit 1035 refers to the characteristic information of the partial area adjacent to R(9). Here, partial areas R(20), R(24) and R(25) are the partial areas having the characteristic information "X" or "E". When determination as to whether the partial area is non eligible for collation ends, control unit 1035 rewrites characteristic information "X" of the partial area to be subjected to determination with "E" (S304). Thus, the characteristic information of partial areas R(20), R(24) and R(25) is rewritten with "E". FIG. 18 illustrates exemplary characteristic information after the characteristic information of partial areas R(20), R(24) and R(25) is rewritten with "E", in association with arrangement of each partial area.

In the present embodiment, if the fingerprint is handled as an image, the characteristic information of each partial area is represented by "H", "R", "L", or "X". Therefore, if there is a blur or an area to which no input is made on the sensor of input unit 101, the characteristic information of that partial area is determined as "X". Utilizing this characteristic, control unit 1035 detects an excluded area such as an image showing blur or an area to which the fingerprint image has not been input.

If the characteristic information "X" is rewritten with "E", control unit 1035 sends a collation determination start signal to determination unit 1034. Determination unit 1034 sets the central area in FIG. 2, that is, partial areas R(1) to R(9), as the partial area to be subjected to matching (similarity score calculation and collation determination) (S310).

When the partial area is set, determination unit 1034 reads the characteristic information from the area storing the characteristic information of partial areas R(1) to R(9) (S312). When the characteristic information is read, determination unit 1034 determines whether "E" indicating the partial area non eligible for collation is present among the read characteristic information (S314). Here, as "E" is present (YES in S314), control unit 1035 sends the matching start signal to search unit 1032. Search unit 1032 sets the value of counter variable I to "1" (S340).

When the value of counter variable I is set to "1", search unit 1032 copies the image of partial area R(I) to reference block 1021 (S342). When the image is copied, search unit 1032 reads characteristic information CR(1) corresponding to partial area R(1) from storage unit 102 (S344). When characteristic information CR(I) is read, search unit 1032 searches for a location attaining the highest matching score within the image, in the image copied in S342 (S346). Here, searching is carried out in the portion not having characteristic information CR(I) determined as "E", among the partial areas. FIG. 19 is a conceptual view showing an input image from which the partial area determined as non eligible for collation has been removed. When the best matching location is searched for, search unit 1032 causes storage unit 102 to store maximum value CIMAX of matching score C(I,S,T) calculated in S346 (S348).

When maximum matching score CIMAX is stored, search unit 1032 calculates movement vector V(I). When movement vector V(I) is calculated, search unit 1032 causes storage unit 102 to store movement vector V(I) (S350).

When movement vector V(I) is stored, search unit 1032 determines whether the value of counter variable I is equal to or smaller than the total number N of the partial areas (S352). Here, as the value of counter variable I is equal to or smaller than the total number N (YES in S352), search unit 1032 increases the value of counter variable I by "1" (S354). Thereafter, the processing in S342 to S354 is repeated while the value of variable I is equal to or smaller than the total number N of the partial area. Maximum matching score CIMAX of each partial area R(I) and movement vector V(I) are thus calculated. As a result of calculation of maximum matching score CIMAX, search unit 1032 searches for the most similar portion in the template image, for each partial area R(I) which is the considered area.

Thereafter, as the value of counter variable I exceeds the total number N of the partial areas (NO in S352), search unit 1032 transmits the matching end signal to control unit 1035. Control unit 1035 transmits the signal instructing start of similarity score calculation to calculation unit 1033. Calculation unit 1033 calculates the similarity score, by using movement vector V(I) of each partial area R(I), maximum matching score CIMAX and the like, that are obtained in matching and stored in storage unit 102. In order to do so, when the similarity score calculation start signal is received, calculation unit 1033 initializes maximum value P(A,B) of the similarity score to "0" (S356). When maximum value P(A,B) of the similarity score is initialized, calculation unit 1033 initializes the value of counter variable I to "1" (S358). When the value of counter variable I is initialized, calculation unit 1033 initializes similarity score P(I) as to reference movement vector V(I) to "0" (S360). When similarity score P(I) is initialized, calculation unit 1033 initializes the value of counter variable J to "1" (S362). When the value of counter variable J is initialized, calculation unit 1033 calculates vector difference dVIJ between reference movement vector V(I) and movement vector V(J) to be compared (S364).

When vector difference dVIJ is calculated, calculation unit 1033 determines whether movement vectors V(I) and V(J) are substantially the same (S366). If it is determined that the movement vectors are substantially the same (YES in S366), calculation unit 1033 increases the value of similarity score P(I) (S368).

When the value of similarity score P(I) is increased, calculation unit 1033 determines whether counter variable J is smaller than the total number N of partial areas (S370). If it is determined that counter variable J is smaller than the total number N of partial areas (YES in S370), calculation unit 1033 increases the value of counter variable J by "1" (S372). As a result of the processing in S360 to S372, similarity score P(I) using the information of the partial area determined to have the movement vector the same as reference movement vector V(I) is calculated.

Thereafter, when counter variable J is equal to or greater than the total number N of partial areas (NO in S370), calculation unit 1033 determines whether similarity score P(I) as to movement vector V(I) is greater than maximum value P(A,B) of the similarity score (S374). Here, if it is assumed that similarity score P(I) is greater than maximum value P(A,B) of the similarity score (YES in S374), calculation unit 1033 substitutes the value of similarity score P(I) as to movement vector V(I) into maximum value P(A,B) of the similarity score (S376). In S374 or S376, calculation unit 1033 assumes similarity score P(I) based on reference movement vector V(I) as most proper as the reference.

When the value is substituted into maximum value P(A,B) of the similarity score, calculation unit 1033 determines whether the value of counter variable I of reference movement vector V(I) is smaller than the total number N of partial areas (S378). As the value of counter variable I is initially smaller than the total number N of partial areas (YES in S378), calculation unit 1033 increases the value of counter variable I by "1" (S380). When the value of counter variable I is increased by "1", the processing in S360 to S380 is repeated. As a result of the processing in S356 to S380, the similarity score between the sensing image and the template image is calculated as the value of variable P(A,B). Calculation unit 1033 stores the calculated value of variable P(A,B) at the prescribed address of storage unit 102, and transmits the similarity score calculation end signal to control unit 1035.

Thereafter, when the value of counter variable I is equal to or greater than the total number N of partial areas (NO in S378), determination unit 1034 determines whether similarity score P(A,B) stored at the prescribed address in storage unit 102 is equal to or greater than predetermined threshold value T(0) (S318). Determination unit 1034 thus determines whether there is a probability that the considered area which is the area other than the excluded area in the first portion matches with any portion of the template image. In addition, determination unit 1034 determines whether the partial area other than the excluded area of the sensing image matches with any portion of the template image, when there is a probability that any partial area of the first portion matches with any portion of the template image. If it is determined that similarity score P(A,B) is equal to or greater than threshold value T(0) (YES in S318), determination unit 1034 outputs information indicating "match" to reference block 1021 (S320).

When the value is output, control unit 1035 outputs information indicating the result of collation stored in reference block 1021 to output unit 104. Output unit 104 outputs the information output by control unit 1035 (S206).

[Example in Which the Partial Area Having the Characteristic Information "E" is Present, the Value of HLEN(0) is Set to "2", and the Value of VLEN(0) is Set to "5"]

An operation of image collating apparatus 100 when the partial area having the characteristic information "E" is present and the value of HLEN(0) is set to "5" will now be described.

As a result of processing until S274, it is provisionally assumed that MAXHLEN is set to 3, MAXVLEN is set to 4, HLEN(0) is set to 2, and VLEN(0) is set to 5 (MAXHLEN=3, MAXVLEN=4, HLEN(0)=2, and VLEN(0)=5). Calculation unit 1033 determines whether relation of MAXHLEN>MAXVLEN and MAXHLEN≧HLEN(0) is satisfied (S216). Here, as MAXHLEN is set to 3, MAXVLEN is set to 4, and HLEN(0) is set to 2 (MAXHLEN=3, MAXVLEN=4, and HLEN(0)=2) (NO in S216), calculation unit 1033 determines whether relation of MAXVLEN>MAXHLEN and MAXVLEN≧VLEN(0) is satisfied (S220). Here, as MAXHLEN is set to 3, MAXVLEN is set to 4, and VLEN(0) is set to 5 (MAXHLEN=3, MAXVLEN=4, and VLEN(0)=5) (NO in S220), calculation unit 1033 stores "X" in an area for storing the characteristic information of partial area R(I), included in first area 1024 or second area 1025. When the characteristic information is stored, calculation unit 1033 transmits the determination end indicating signal to control unit 1035 (S226).

[Example in Which the Partial Area Having the Characteristic Information "E" is Present, MAXHLEN is Set to 4 and MAXVLEN is Set to 15 (MAXHLEN=4, MAXVLEN=15), and the Value of VLEN(0) is Set to "2"]

An operation of image collating apparatus 100 when MAXHLEN is set to 4 and MAXVLEN is set to 15 (MAXHLEN=4, MAXVLEN=15), and the value of VLEN(0) is set to "2" will now be described.

As a result of processing until S274, it is provisionally assumed that MAXHLEN is set to 4, MAXVLEN is set to 15, and VLEN(0) is set to "2" (MAXHLEN=4, MAXVLEN=15, and VLEN(0)=2). When the value represented by maximum value MAXVLEN is output, calculation unit 1033 determines whether relation of MAXHLEN>MAXVLEN and MAXHLEN≧HLEN(0) is satisfied (S216). Here, as MAXHLEN is set to 4, MAXVLEN is set to 15, and VLEN(0) is set to "2" (MAXHLEN=4, MAXVLEN=15, and VLEN(0)=2) (NO in S216), calculation unit 1033 determines whether relation of MAXVLEN>MAXHLEN and MAXVLEN≧VLEN(0) is satisfied (S220). Here, as MAXHLEN is set to 4, MAXVLEN is set to 15, and VLEN(0) is set to "2" (MAXHLEN=4, MAXVLEN=15, and VLEN(0)=2) (YES in S220), calculation unit 1033 calculates total sum AS of logical products (S221). When total sum AS of logical products is calculated, determination unit 1034 determines whether total sum AS of logical products is equal to or greater than threshold value TF (S222). Here, if total sum AS of logical products is set to 3 and threshold value TF is set to 5 (total sum AS of logical products=3, threshold value TF=5) (NO in S222), calculation unit 1033 stores "R" in an area storing the characteristic information of partial area R(I), included in first area 1024 or second area 1025. When the characteristic information is stored, calculation unit 1033 transmits the signal indicating the end of determination to control unit 1035 (S223).

[Example in Which the Partial Area Having the Characteristic Information "E" is Not Present]

When the characteristic information is read as a result of processing until S312, determination unit 1034 determines whether "E" indicating the partial area non eligible for collation is present among the read characteristic information (S314). Here, as there is no "E" among the characteristic information (NO in S314), control unit 1035 sends the matching start signal to search unit 1032. Search unit 1032 sets index minimum value IMIN described above as the value of counter variable I (S400).

When index minimum value IMIN is set, after the processing in S342, search unit 1032 calculates matching score C(I, S,T). When matching score C(I,S,T) is calculated, search unit 1032 stores the value of matching score C(I,S,T) in reference block 1021, in association with counter variable I and coordinate (S,T) of the template image (S420).

When the value of matching score C(I,S,T) is stored, search unit 1032 determines whether there is a coordinate for which matching score C(I,S,T) has not yet been calculated, among the coordinates of the template image (S422). As there is initially a coordinate for which matching score C(I,S,T) has not yet been calculated (YES in S422), search unit 1032 updates coordinate (S,T) of the template image to a coordinate adjacent to the coordinate for which matching score C(I,S,T) has been calculated in S422 (S424). When the coordinate is updated, the processing in S422 to S424 is repeated.

When there is no longer a coordinate for which matching score C(I,S,T) has not yet been calculated (NO in S422), search unit 1032 searches for the maximum value among matching scores C(I,S,T) stored in reference block 1021. When maximum variable CIMAX of matching score C(I,S,T) is searched for, search unit 1032 assumes the area having width W and height H, with the coordinate at which maximum variable CIMAX has been calculated as origin, as the area attaining the highest matching score with partial area R(I), among coordinates (S,T) of the template image (S426).

When maximum variable CIMAX is searched for, after the processing in S348 to S350, search unit 1032 determines whether the value of counter variable I is smaller than index maximum value IMAX of the considered partial area (S404). If it is determined that the value of counter variable I is smaller than maximum value IMAX (YES in S404), the processing in S342 to S354 is repeated after the processing in S354.

Thereafter, if it is determined that the value of counter variable I is equal to or greater than maximum value IMAX (NO in S404), after the processing in S356 to S368, calculation unit 1033 determines whether counter variable J is smaller than index maximum value IMAX of the partial area (S406). If it is determined that counter variable J is initially smaller than maximum value IMAX (YES in S406), the processing in S364 to S372 is repeated after the processing in S372.

Thereafter, if it is determined that counter variable J is equal to or greater than maximum value IMAX (NO in S406), calculation unit 1033 determines whether similarity score P(I) as to movement vector V(I) is greater than maximum value P(A,B) of the similarity score (S408). If it is determined that similarity score P(I) is greater than maximum value P(A, B) of the similarity score (YES in S408), after the processing in S376, calculation unit 1033 determines whether the value of counter variable I is smaller than index maximum value IMAX of the partial area (S410). Here, if it is assumed that the value of counter variable I is smaller than index maximum value IMAX (YES in S410), the processing in S360 to S380 is repeated, after the processing in S380. As a result of the processing in S356 to S380 shown in FIG. 13, the similarity score between the sensing image and the template image is calculated as the value of variable P(A,B).

Thereafter, if the value of counter variable I is equal to or greater than index maximum value IMAX (YES in S410), calculation unit 1033 stores the value of variable P(A,B) at the prescribed address in memory 102. When the value is stored, calculation unit 1033 transmits the similarity score calculation end signal to control unit 1035. Determination unit 1034 determines whether maximum value P(A,B) of the similarity score is smaller than threshold value T(2) (S326). Here, if it is determined that maximum value P(A,B) is equal to or greater than threshold value T(2) (NO in S326), determination unit 1034 determines whether maximum value P(A,B) of the similarity score is equal to or greater than threshold value T(1), which is greater than threshold value T(2) (S328). Here, if it is determined that maximum value P(A,B) of the similarity score is equal to or greater than threshold value T(1) (YES in S328), determination unit 1034 outputs information indicating "match" (for example, a value of "1") to reference block 1021 (S320). It is thus determined that the sensing image and the template image were taken from the same fingerprint.

As described above, the image collating apparatus according to the present embodiment is capable of processing for including all the central areas and the peripheral areas as the areas to be subjected to collation, at the time point when the image non eligible for collation is detected in the central area.

For instance, an example in which R(6), R(8) and R(9) shown in FIG. 2 are non eligible for collation (having the characteristic information "E") and the threshold value (T(0), T(1)) is set to "0.7" will be described. Here, if a collation method using solely the central portion of the image is employed and if collation with regard to the partial areas other than R(6), R(8) and R(9) among the central areas is successful, the similarity score is expressed as in the equation below. As this value is smaller than the threshold value, collation eventually fails.

the number of partial areas for which collation is successful/total number of areas=6/9=0.667

If it is assumed that collation with regard to all peripheral areas is successful, the similarity score is expressed as in the equation below. This value means that collation is successful.

the number of partial areas for which collation is successful/total number of areas=22/25=0.88

Consequently, an image collating apparatus, an image collating method, and an image collating program product can be provided, in which collation ends when determination as to whether one image is the same as the other image can be made using only a part of one image and collation of a remaining portion of the image is not necessary, and even though a part of one image is non eligible for collation due to blur or the like, collation can still be carried out using the image that can originally be subjected to collation.

As a variation, a program for implementing image collating apparatus 100 described above may be implemented as a data file used for spreadsheet software.

In addition, as a variation, if there are a plurality of reference images, it is likely that most reference images do not match with the image to be collated. As unmatch with the image to be collated is likely, S328 may not be performed, thus effectively saving time.

Moreover, as a variation, the image data to be collated may be image data of characteristics of a living body except for fingerprint, such as those similar among individuals but not matching with each other.

Further, as a variation, the image data to be collated may be image data of a linear pattern or other image data.

In addition, as a variation, in the processing in S210 to S226, instead of finding the characteristic information based on the number of continuous black pixels, the characteristic information may be found also based on the number of continuous white pixels.

Moreover, as a variation, in S302, the criterion on which determination as to whether the partial area is non eligible for collation is made is not limited to that in the description above (at least two partial areas having the characteristic information "X" continue in at least one of the vertical direction, the lateral direction, and the oblique direction). For example, all partial areas having the characteristic information "X" may be determined as non eligible for collation. Control unit 1035 thus detects as the excluded area, any of the areas having the predetermined information as the characteristic information.

Further, as a variation, between S328 and S330, search unit 1032 or the like may set a criterion value which is a value representing a probability that a portion of the sensing image including the first portion matches with any portion of the template image. Here, determination unit 1034 may determine whether the criterion value exceeds the threshold value. The threshold value used for determination is desirably a value corresponding to a size of the portion of the sensing image including the first portion.

In addition, as a variation, the data of the template image may be data stored in advance.

Moreover, as a variation, the processing in S328 may not be performed. If the processing in S328 is not performed, determination unit 1034 determines through the processing in S334 whether the partial area other than the excluded area of the sensing image matches with any portion of the template image, when the first portion matches with any portion of the template image.

Second Embodiment

An image collating apparatus according to a second embodiment of the present invention will be described hereinafter.

The hardware configuration of the image collating apparatus according to the present embodiment is the same as that in the first embodiment described above, and the function thereof is also the same. Therefore, detailed description thereof will not be repeated.

Figure 20:
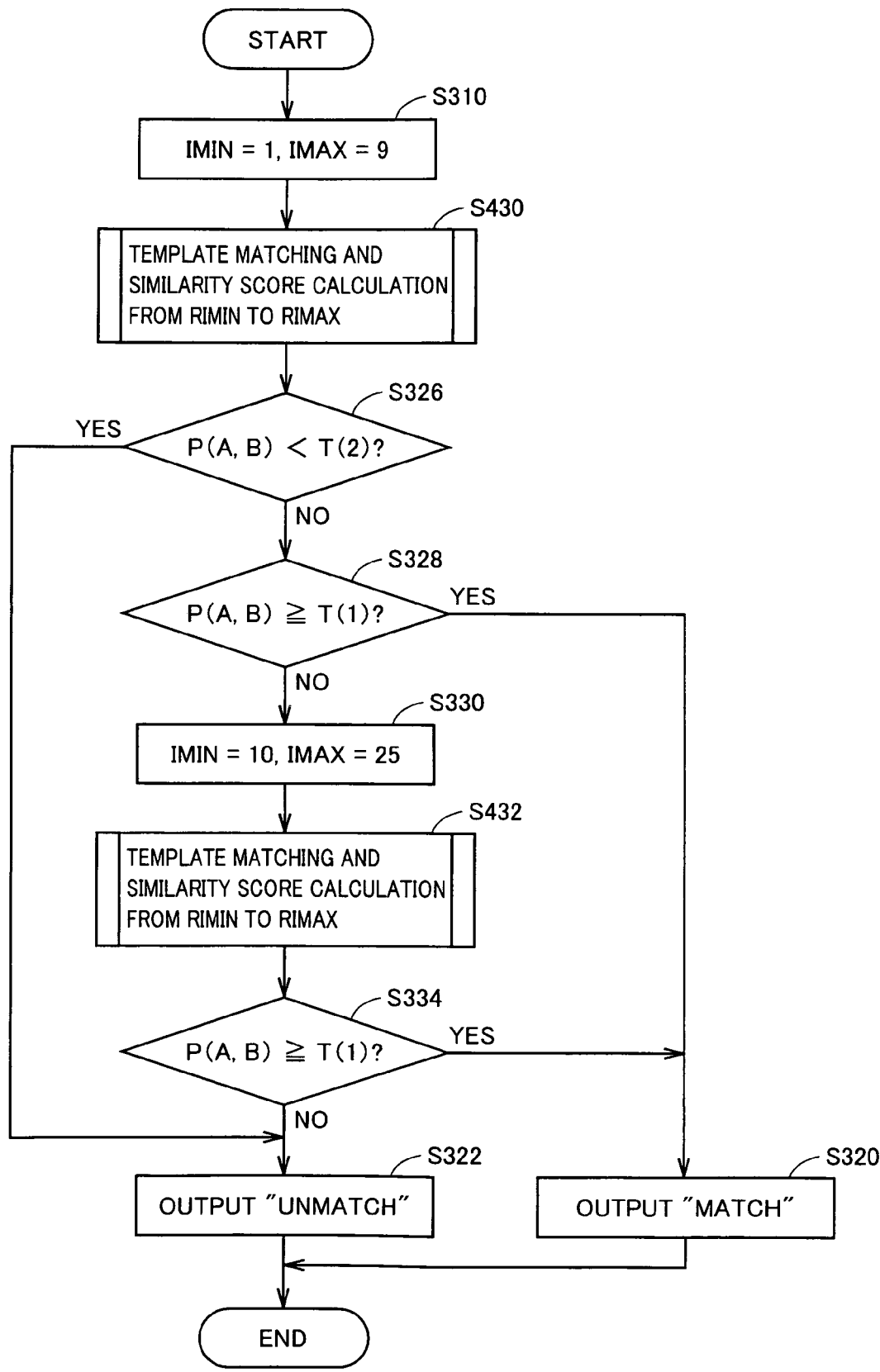
FIG. 20 is a flowchart showing a procedure for controlling similarity score calculation processing and collation determination processing according to a second embodiment of the present invention.

Referring to FIG. 20, the program executed in image collating apparatus 100 carries out control for similarity score calculation and collation determination as follows. It is noted that the processing in the flowchart in FIG. 20 that has been shown in FIG. 11 described previously is given the same step number, and the processing is also the same. Therefore, detailed description thereof will not be repeated.

In S430, search unit 1032 or the like carries out matching and similarity score calculation with regard to the partial area to be subjected to matching, that is set by determination unit 1034. The processing corresponds to the processing in S342 to S380 and the processing in S440 to S450 shown in FIG. 21.

In S432, search unit 1032 or the like carries out matching and similarity score calculation with regard to the partial area to be subjected to matching, that is set by determination unit 1034. The processing corresponds to the processing in S342 to S380 and the processing in S440 to S450 shown in FIG. 21.

Figure 21:
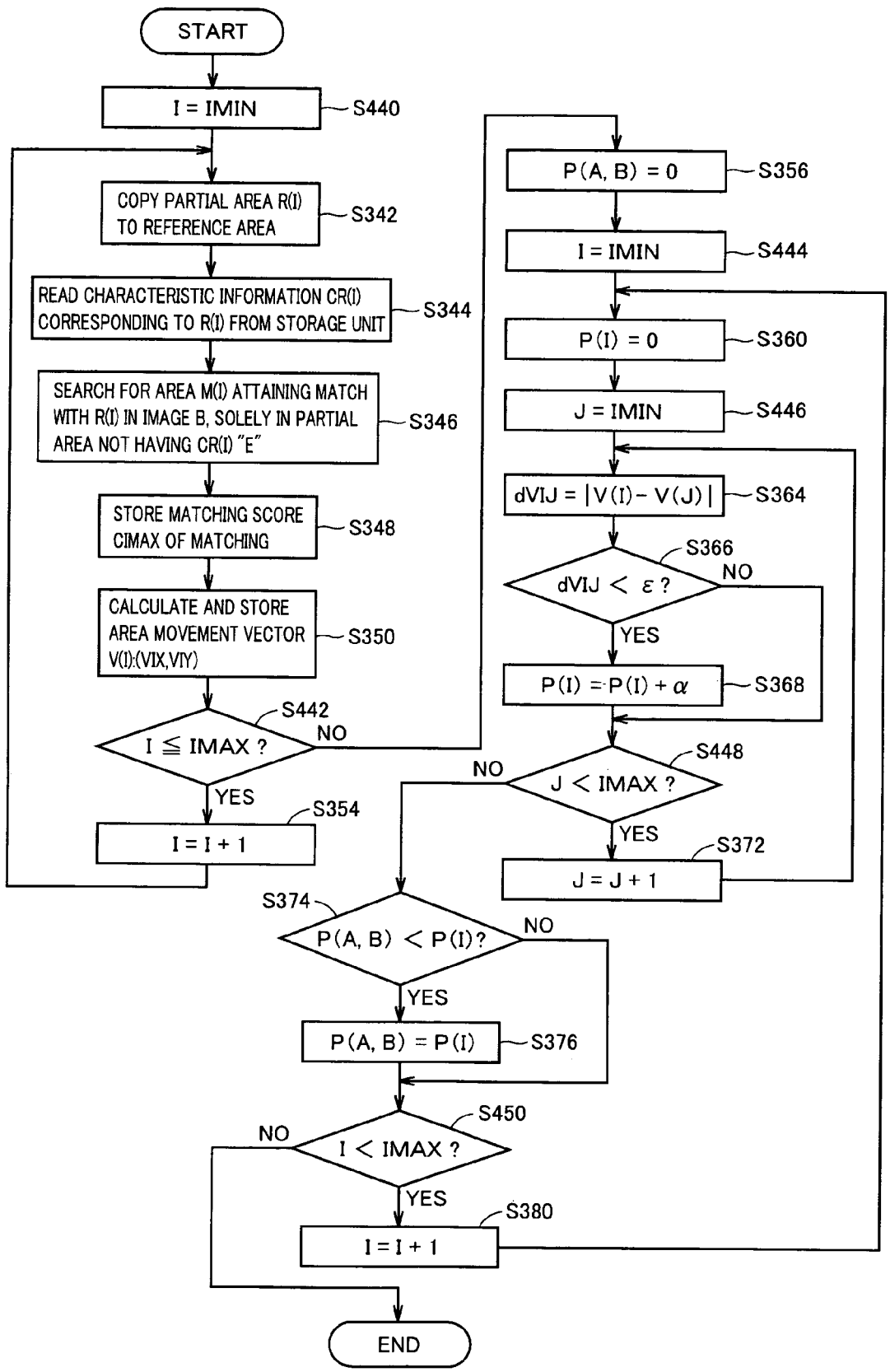
FIG. 21 is a flowchart showing a procedure for controlling matching and similarity score calculation processing according to the second embodiment of the present invention.

Referring to FIG. 21, the program executed in image collating apparatus 100 carries out control for matching and similarity score calculation as follows. It is noted that the processing in the flowchart in FIG. 21 that has been shown in FIG. 12 described previously is given the same step number, and the processing is also the same. Therefore, detailed description thereof will not be repeated.

In S440, control unit 1035 sends the matching start signal to search unit 1032. Thereafter, control unit 1035 waits until the matching end signal is received. Search unit 1032 substitutes the value of IMIN into counter variable I.

In S442, search unit 1032 determines whether the value of counter variable I is equal to or smaller than IMAX. If it is determined that the value of counter variable I is equal to or smaller than IMAX (YES in S442), the process proceeds to S354. Otherwise (NO in S352), the process proceeds to S356.

In S444, calculation unit 1033 substitutes the value of IMIN into counter variable I. In S446, calculation unit 1033 substitutes the value of IMIN into counter variable J.

In S448, calculation unit 1033 determines whether counter variable J is smaller than IMAX. If it is determined that counter variable J is smaller than IMAX (YES in S448), the process proceeds to S372. Otherwise (NO in S448), the process proceeds to S374.

In S450, calculation unit 1033 determines whether the value of counter variable I is smaller than IMAX. If it is determined that the value of counter variable I is smaller than IMAX (YES in S450), the process proceeds to S380. Otherwise (NO in S378), the process ends.

It is noted that other process flows are the same as those in the first embodiment described previously, and the function thereof is also the same. Therefore, detailed description thereof will not be repeated.

An operation of image collating apparatus 100 based on the configuration and the flowchart as above will now be described.

After the processing until S310 ends, control unit 1035 sends the matching start signal to search unit 1032. Thereafter, control unit 1035 waits until the matching end signal is received. Search unit 1032 substitutes the value of IMIN into counter variable I (S440). When the value of IMIN is substituted into counter variable I, after the processing in S342 to S350, search unit 1032 determines whether the value of counter variable I is equal to or smaller than IMAX (S442). As it is determined that the value of counter variable I is initially equal to or smaller than IMAX (YES in S442), the processing in S342 to S354 is repeated.

Thereafter, when it is determined that the value of counter variable I exceeds IMAX (NO in S442), after the processing in S356, calculation unit 1033 substitutes the value of IMIN into counter variable I (S444). When the value of IMIN is substituted, after the processing in S360, calculation unit 1033 substitutes the value of IMIN into counter variable J (S446). When the value of IMIN is substituted, after the processing in S364 to S368, calculation unit 1033 determines whether counter variable J is smaller than IMAX (S448). As it is determined that counter variable J is initially smaller than IMAX (YES in S448), the processing in S360 to S372 is repeated.

Thereafter, when it is determined that the value of counter variable J is equal to or greater than IMAX (NO in S448), after the processing in S374 to S376, calculation unit 1033 determines whether the value of counter variable I is smaller than IMAX (S450). While the value of counter variable I is smaller than IMAX (YES in S450), the processing in S360 to S380 is repeated.

Thereafter, when it is determined that the value of counter variable I is equal to or greater than IMAX (NO in S450), after the processing in S326 to S330, search unit 1032 or the like carries out matching and similarity score calculation with regard to the partial area to be subjected to matching, that is set by determination unit 1034 (S432). When matching and similarity score calculation are performed, determination unit 1034 determines whether maximum value P(A,B) of the similarity score is equal to or greater than threshold value T(1) (S334). Determination unit 1034 thus determines whether the partial area other than the excluded area in the sensing image matches with any portion of the template image, when there is a probability that the first portion matches with any portion of the template image.

As described above, when an image non eligible for collation is detected in the central area, the image collating apparatus according to the present embodiment handles such an area as the area non eligible for collation, thus permitting collation of peripheral areas, Consequently, an image collating apparatus, an image collating method, and an image collating program product can be provided, in which collation ends when determination as to whether one image is the same as the other image can be made using only a part of one image and collation of a remaining portion of the image is not necessary, and even though a part of one image is non eligible for collation due to blur or the like, collation can still be carried out using the image that can originally be subjected to collation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image collating apparatus for performing an image collation operation comprising:
    a storage device storing image data representing a sensing image of an object sensed by a sensor, template data representing a template image, and a program; and
    a processor receiving commands from said program for
    (a) detecting exclusion areas in said sensing image to be excluded from said image collation operation based on classification of image patterns,
    (b) determining whether or not said sensing image and said template image are derived from the identical object by performing template-matching operations to evaluate similarity between said template image and partial images of said sensing image in different levels, in said different levels said processor increasing the size of area covered by said partial image to be matched with said template image level by level, and at least in one level said processor performing the template-matching operation with respect to said partial image where said exclusion areas are excluded,
    wherein each of said partial images includes a plurality of partial areas of said sensing image, and said processor, in the process for determining, determines whether a first partial image among said partial images includes said exclusion area, said first partial image including said partial areas at predetermined positions in the first level, and when said first partial image includes said exclusion area, skips said first level and then determines in the second level whether or not said sensing image and said template image are derived from the identical object based on the template-matching operation between said template image and a second partial image among said partial images which is larger than said first partial image and other than said exclusion areas.

2. The image collating apparatus according to claim 1, wherein said processor, in the process for determining,
    (b-1) determines that said sensing image and said template image are derived from the identical object when a first partial image among said partial images matches with any portion of said template image, said exclusion areas being excluded from said first partial image and
    (b-2) when said first partial image does not match with said template image, determines whether or not said sensing image and said template image are derived from the identical object based on the template-matching operation between said template image and a second partial image among said partial images which is larger than said first partial image and other than said exclusion areas.

3. The image collating apparatus according to claim 1, wherein
    said processor specifies, in the process for detecting, characteristic information which corresponds to classification of the image patterns in arrangements of pixels of an identical color in said partial image, and detects said excluded areas based on said characteristic information.

4. The image collating apparatus according to claim 3, wherein each of said partial images includes a plurality of partial areas of said sensing image, and
    said exclusion area includes a first partial area and second partial areas adjacent to the first partial area, wherein said first and second partial areas correspond to the same classification category.

5. The image collating apparatus according to claim 1, wherein
    each of said partial images includes a plurality of partial areas of said sensing image,
    said processor searches for a most similar portion in said template image for each said partial area, and
    said processor calculates similarity score between at least a part of said sensing image and at least a part of said template image based on positional relation between each said partial area and said searched portion.

6. The image collating apparatus according to claim 5, wherein
    said processor, in the first level of said different levels, determines that said partial image matches with any portion of said template image if said similarity score is equal to or greater than a first threshold value, and determines that said partial image is different from any portion of said template image if said similarity score is smaller than a second threshold value.

7. The image collating apparatus according to claim 5, wherein
    said processor, in the process for calculating, calculates the number of partial areas which satisfies a prescribed requirement of positional relation between a plurality of said partial areas and said searched portion.

8. The image collating apparatus according to claim 1, wherein
    said partial image in the first level includes a partial area located in a center of said sensing image.

9. The image collating apparatus according to claim 1, wherein
    said processor determines whether or not said sensing image and said template image are derived from the identical object based on different threshold values in the different levels.

10. The image collating apparatus according to claim 1, wherein
said storage device includes a device storing in advance the data representing said template image.

11. The image collating apparatus according to claim 1, further comprising an input unit receiving data of an image of fingerprint as said image data representing the sensing image.

12. A method of collating an image for performing an image collation operation, comprising the steps of:
storing image data representing a sensing image of an object sensed by a sensor, and template data representing a template image;
detecting exclusion areas in said sensing image to be excluded from said image collation operation based on classification of image patterns; and
determining whether or not said sensing image and said template image are derived from the identical object by performing template-matching operations to evaluate similarity between said template image and partial images of said sensing image in different levels, in said different levels said processor increasing the size of area covered by said partial image to be matched with said template image level by level, wherein said step of determining includes the step performing the template-matching operation of at least in one level with respect to said partial image where said exclusion areas are excluded,
wherein each of said partial images includes a plurality of partial areas of said sensing image, and said processor, in the process for determining, determines whether a first partial image among said partial images includes said exclusion area, said first partial image including said partial areas at predetermined positions in the first level, and when said first partial image includes said exclusion area, skips said first level and then determines in the second level whether or not said sensing image and said template image are derived from the identical object based on the template-matching operation between said template image and a second partial image among said partial images which is larger than said first partial image and other than said exclusion areas.

13. A computer readable recording medium recording an image collating program for performing an image collation operation causing a computer to execute the steps of:
storing image data representing a sensing image of an object sensed by a sensor and template data representing a template image;
detecting exclusion areas in said sensing image to be excluded from said image collation operation based on classification of image patterns; and
determining whether or not said sensing image and said template image are derived from the identical object by performing template-matching operations to evaluate similarity between said template image and partial images of said sensing image in different levels, in said different levels said processor increasing the size of area covered by said partial image to be matched with said template image level by level, wherein said step of determining includes the step performing the template-matching operation of at least in one level with respect to said partial image where said exclusion areas are excluded,
wherein each of said partial images includes a plurality of partial areas of said sensing image, and said processor, in the process for determining, determines whether a first partial image among said partial images includes said exclusion area, said first partial image including said partial areas at predetermined positions in the first level, and when said first partial image includes said exclusion area, skips said first level and then determines in the second level whether or not said sensing image and said template image are derived from the identical object based on the template-matching operation between said template image and a second partial image among said partial images which is larger than said first partial image and other than said exclusion areas.

* * * * *